United States Patent [19]

Rakib

[11] Patent Number: 5,608,755
[45] Date of Patent: Mar. 4, 1997

[54] METHOD AND APPARATUS FOR IMPLEMENTING CARRIERLESS AMPLITUDE/PHASE ENCODING IN A NETWORK

[76] Inventor: Selim Rakib, 5360 Toscana Way, #G107, San Diego, Calif. 92122

[21] Appl. No.: 336,821

[22] Filed: Nov. 8, 1994

Related U.S. Application Data

[63] Continuation-in-part of Ser. No. 324,171, Oct. 14, 1994.

[51] Int. Cl.$^6$ .............................. H04L 5/16; H04L 5/12
[52] U.S. Cl. ...................... 375/219; 375/261; 370/201
[58] Field of Search .................................... 375/257, 220, 375/228, 224, 219, 377, 354, 222, 261, 340, 231, 295, 298, 316, 362; 370/85.11, 110.1, 85.1, 85.28, 32, 32.1; 379/93

[56] References Cited

U.S. PATENT DOCUMENTS

| | | |
|---|---|---|
| 3,479,462 | 11/1969 | Yamato et al. . |
| 3,517,137 | 6/1970 | Ribner . |
| 3,651,474 | 3/1972 | Liberman . |
| 3,828,130 | 8/1974 | Yamaguchi . |
| 4,172,963 | 10/1979 | Belcher et al. . |
| 4,231,114 | 10/1980 | Dolikian . |
| 4,455,663 | 6/1984 | Ragsdale . |
| 4,606,022 | 8/1986 | Suzuki et al. ......................... 370/85.11 |
| 4,635,249 | 1/1987 | Bortolini et al. . |
| 4,651,330 | 3/1987 | Ballance . |
| 4,691,294 | 9/1987 | Humpleman . |
| 4,794,596 | 12/1988 | Gloyne et al. . |
| 4,924,492 | 5/1990 | Gitlin et al. .............................. 379/93 |
| 5,214,637 | 5/1993 | Sridhar et al. .......................... 375/261 |
| 5,331,670 | 7/1994 | Sorbara et al. ......................... 375/362 |
| 5,347,539 | 9/1994 | Sridhar et al. .......................... 375/222 |
| 5,444,712 | 8/1995 | Betts et al. ............................ 370/110.1 |
| 5,452,330 | 9/1995 | Goldstein .............................. 370/85.11 |

*Primary Examiner*—Stephen Chin
*Assistant Examiner*—Tesfaldet Bocure
*Attorney, Agent, or Firm*—Baker, Maxham, Jester & Meador

[57] ABSTRACT

A method and apparatus for (1) transmitting large amounts of data between a least a first and second station over a twisted pair, (2) reducing cross talk in a network using carrierless amplitude modulation and phase modulation encoding (CAP) with independent data clock source at each station, (3) providing a relatively simple and fast data detection apparatus, (4) maintaining synchronization between stations during idle periods while minimizing cross talk, (5) providing a technique to allow filters to be trained during idle periods, and (6) providing a technique which allows automatic gain control to be used with CAP. Particular signalling symbols are associated with each of the following conditions: (1) idle state, (2) preamble, (3) start of frame detection, (4) test condition, (5) each possible combination of five binary bits representing 32 different data symbols, and (6) jam condition. For example, a unique pair of the four inner most points on the CAP 36 constellation are used for indicating idle mode. All four inner most points are used for testing the link and training the filters in the receiver.

22 Claims, 17 Drawing Sheets

METHOD AND APPARATUS FOR IMPLEMENTING CARRIERLESS AMPLITUDE/PHASE ENCODING IN A NETWORK

BACKGROUND OF THE INVENTION

1. Related Applications

The present application is a continuation-in-part of U.S. patent application Ser. No. 80/324,171 by the present inventor, filed on Oct. 14, 1994.

2. Field of the Invention

This invention relates to encoding schemes for communicating data from point to point, and more particularly to a method and apparatus for carrierless phase/amplitude encoding data to be communicated over a communications network.

3. Description of Related Art

Communications over wire has been advancing at a rapid pace. Wide area networks (WANs) and local area networks (LANs) are in greater use to transmit data than ever before. This expansion in use does not appear to be slowing, and in fact appears to be accelerating. In the face of the proliferation of systems to transmit digital information, new techniques for transmitting greater amounts of such information are in demand. However, one of the factors that limits the amount of information that can be transmitted over a network is the maximum frequency of signals that can be easily transmitted. A number of reasons exist for the limits on the frequency which can be transmitted. One reason in particular is that the electro-magnetic fields which are emitted from a conductor carrying a signal increase in magnitude as the frequency of the signal being transmitted on that conductor increases. These fields are received by other nearby conductors and interfere with the signals being carried on those conductors. In addition, the Federal Communications Commission regulates the amount of electromagnetic interference which may emanate from equipment.

For example, LANs which comply with the well-known ethernet standard typically require four twisted pairs of conductors for communication between two stations on the network. Two of these pairs are dedicated to transmission in one direction, and another two pairs are bidirectional. Using four pairs of conductors increases the amount of information that can be transmitted in a predetermined period of time. However, the need to provide four twisted pairs increases the cost of installing a LAN. Furthermore, there are a number of buildings that have less than four twisted pairs available.

In accordance with one new technique currently under consideration, data to be transmitted is encoded using carrierless amplitude-modulation, phase-modulation encoding (CAP). In accordance with CAP, an impulse is generated which has two components. The first component is an in-phase signal; the second component is a quadrature signal. As implied by the name, the quadrature signal is 90° out of phase with the in-phase signal. Each component may have an amplitude which is equal to one of six different amplitude levels. By combining the two components, an impulse may be generated which has 36 unique combinations of in-phase signal amplitude and quadrature signal amplitude. These 36 combinations are typically referred to as a CAP 36 constellation.

Upon receipt of a CAP 36 impulse, the amplitude of the in-phase component and the quadrature component is determined. By identifying points on the CAP 36 constellation with a data value, a single CAP signal can be decoded to represent up to 5 bits of digital data. For example, in one scheme known as "CAP 32", 32 of the points are associated with the 32 possible values that can be represented by five binary digits; the other 4 points are ignored or invalid. As a result, the rate at which digital information can be transmitted can be increased by a factor of five without increasing the frequency of the signal used to transmit that information.

Because CAP signals are both phase and amplitude sensitive, transmission of CAP information along wires is more sensitive to interference than are signals which do not encode data by modulating phase and amplitude. For example, cross talk between adjacent wires carrying different signals can be particularly troublesome to systems which implement encoding schemes such as CAP. Cross talk adds noise to signals in adjacent wires. The amount of distortion is dependent upon the power of the electromagnetic waves that radiate from each of the wires, and the amount of that radiation which is converted to current in each adjacent wire. Since systems such as ethernet LANs have cables containing a plurality of conductors, pairs of which are twisted together to carry unique information, cross talk between these pairs of conductors must be tamed to minimize ingress to the signals being carried on each pair.

In addition, it is difficult in systems using CAP encoding to detect line status rapidly. It is important to detect line status rapidly for many reasons, including detection of collisions (attempts by more than one station to transmit on the same line). Rapid line status detection also allows the number of overhead bits required to synchronize and initiate decoding circuitry to be reduced.

Also, since networks, such as Ethernet, do not require signal activity to be constantly present, maintaining synchronization between remote devices during idle periods presents a problem. That is, when a device is not receiving data for an extended period of time, its internal receive clock may fall out of synchronization with the transmit clocks of other devices in the network.

Another problem which results from the fact that a signal is typically not continuously present in systems, such as Ethernet systems, is that filters at the receivers and transmitters must be trained on data. This means that data may become distorted because conditions over the network have changed. Thus, the filters are modified as the first frames of data (i.e., preamble and bits of substantive data) are being received. This problem becomes acute when data is not transmitted for an extended period of time, since large changes in the characteristics of the network can occur during long idle periods. Furthermore, a receive clock from one station needs to be phase locked to the transmit clock of another station in order to properly decode received data. This typically requires constant adjustments to the receive or transmit clock during reception of data.

Still further, a system which relies on CAP encoding will typically benefit from an automatic gain control circuit. However, automatic gain control circuits may be difficult to manage in an environment in which data signals are exposed to interference as is the case in Ethernet systems.

Therefore, there is a need for a method and apparatus for reducing cross talk in a network using CAP encoding, providing a relatively simple and rapid line status detection apparatus, maintaining synchronization between stations during idle periods while minimizing cross talk, providing a technique to allow filters to be trained during idle periods, and providing a technique which allows automatic gain control to be used with CAP encoding.

SUMMARY OF THE INVENTION

The present invention is a method and apparatus for transmitting data between a least a first and second station over a network interface, such as the well-known ethernet network. The present invention provides a method and apparatus for reducing cross talk in a network using carrierless amplitude modulation and phase modulation encoding (CAP) with independent data clock source at each station, providing a relatively simple and fast data detection apparatus, maintaining synchronization between stations during idle periods while minimizing cross talk, providing a technique to allow filters to be trained during idle periods, and providing a technique which allows automatic gain control to be used with CAP.

In accordance with the present invention, stations on a network have a transceiver which has a receiver section (the receiver) and transmitter section (the transmitter) for transmitting and receiving information to and from the network. Preferably, only two transceivers are coupled to any two pairs of signal lines. Each pair is preferably unidirectional. One of the major advantages of the present invention is the ability to communicate relatively large amounts of data over two twisted pairs of conductors.

In accordance with the present invention the receiver comprises a low pass filter (LPF), an automatic gain controlled amplifier (AGC), an analog-to-digital circuit (A/D), a near end cross-talk (NEXT) canceler, an in-phase and a quadrature detector, a decoder including a fast line status detection, a first-in/first-out circuit (FIFO), and a descrambler. The transmitter comprises a scrambler, a FIFO, an encoder, an in-phase and a quadrature modulator, a summing circuit, a digital-to-analog converter (D/A), an amplifier, and an LPF.

The inventive aspects of the present invention lie in the scheme used to encode and decode data as CAP signals, the fast line status detect circuit within the decoder, the use of an AGC to improve the received signal, and the configuration of the NEXT canceler. In addition, the present invention provides a method for reducing cross-talk between receive and transmit signals by using a particular arrangement of points from a CAP 36 constellation to represent various control signals, increasing the speed at which line status may be detected, maintaining synchronization between the transmit clock and the receive clock during idle periods, maintaining a relatively constant phase relationship between the receive clock and the transmit clock, and generating a signal reporting a "jam" condition (i.e., signals are received at a hub by more than one station).

In accordance with the present invention, particular signalling symbols are associated with each of the following conditions: (1) idle state, (2) preamble, (3) start of frame detection, (4) test condition, (5) each possible combination of five binary bits representing 32 different data symbols, and (6) jam condition. For example, a unique pair of the four inner most points on the CAP 36 constellation are used for indicating idle mode. All four inner most points are used for testing the link and training the filters in the receiver. Two of the four points at the outer-most corners of the CAP 36 constellation are used as a preamble prior to transmission of data. The other two points at the outer-most corners of the CAP 36 constellation are used to transmit the first bit of data after the end of the preamble (i.e., start of frame detection). A first inner most point and a first outer-most point within the same quadrant of the CAP 36 constellation are used to signal a jam condition.

The particular assignment of each of the conditions is designed to reduce cross-talk by selecting signals to be transmitted on the transmit pair which have a low frequency due to the manner in which the in-phase and quadrature signals combine, and which are relatively distant in amplitude from the amplitude of signals likely to be present on the receive line of the pair. In addition, the present invention provides rapid detection of a preamble by bypassing the encoder and the scrambler at the transmit side, and the decoder and descrambler at the receive side. Since the encoder and scrambler are bypassed during transmission of the preamble, a means for synchronizing the scrambler and descrambler circuits after the preamble has been completely transmitted is required. The present invention provides for synchronization of the scrambler and descrambler by providing a unique symbol for the first bit of data transmitted after a preamble.

By transmitting a test signal at intervals as required by each receiver, each receiver can maintain synchronization with the associated transmitter. Furthermore, in accordance with the present invention, differences between the phase of the receive clock and the transmit clock can be identified by shifts in the constellation points received from those points which are expected. That is, each point on the CAP 36 constellation is expected to fall generally within a narrow range of amplitudes for the in-phase and quadrature signals which define the points of the CAP 36 constellation. If the signals received are decoded and determined to each be shifted a relatively equal amount, the difference between the received points and the expected points is calculated and the phase of the receive clock is adjusted to correct for the difference.

In addition, test signals can be used to train receive filters as required during periods when no data is being transmitted. In this way, filters are accurately configured for data prior to transmission of the data. Thus, data is not distorted by the fact that the filters are not properly configured.

The present invention allows an AGC to be used to ensure that the full dynamic range of the A/D is used, while preventing saturation or clipping by exceeding the maximum input levels of the A/D. In accordance with the present invention, a servo loop of the AGC controls the gain of a variable gain amplifier (VGA). The servo loop operates in one of two modes. The first mode is a high servo loop gain mode (non-data mode). The second mode is a low servo loop gain mode (data mode). In non-data mode, the VGA has lower gain for signals output by the A/D. Furthermore, the speed of the servo loop is decreased when receiving data to prevent the gain from being increased by a short periods in which a number of low amplitude data symbols are received.

In accordance with the present invention, the NEXT canceler can be relatively simple, since the interference that is likely to be present due to near end cross-talk is one of a limited number of patterns. For example, when data is present on one line, the other line can only be in the test or idle state. The signals transmitted during test and idle states are well defined. Therefore, cancellation of the near end cross-talk due to these signals is simplified.

In accordance with the present invention, the jam condition symbol includes a symbol which is unique from any of the data symbols. Thus, when a jam occurs, the indication transmitted can be distinguished from data as well as from each of the other possible states.

In another embodiment of the present invention, control symbols are transmitted out of band over an out of band control channel. A first twisted pair (i.e., two wires) is used to communicate information over a data channel between a first and second station, and a second twisted pair is used to communicate overhead (control) information over a control channel. Each of the twisted pairs carry signals in the same direction. When information is being transmitted from the first station to the second station, the control channel carries a clock pattern, and the data channel carries data patterns (i.e., preferably CAP encoded signal patterns).

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1A:
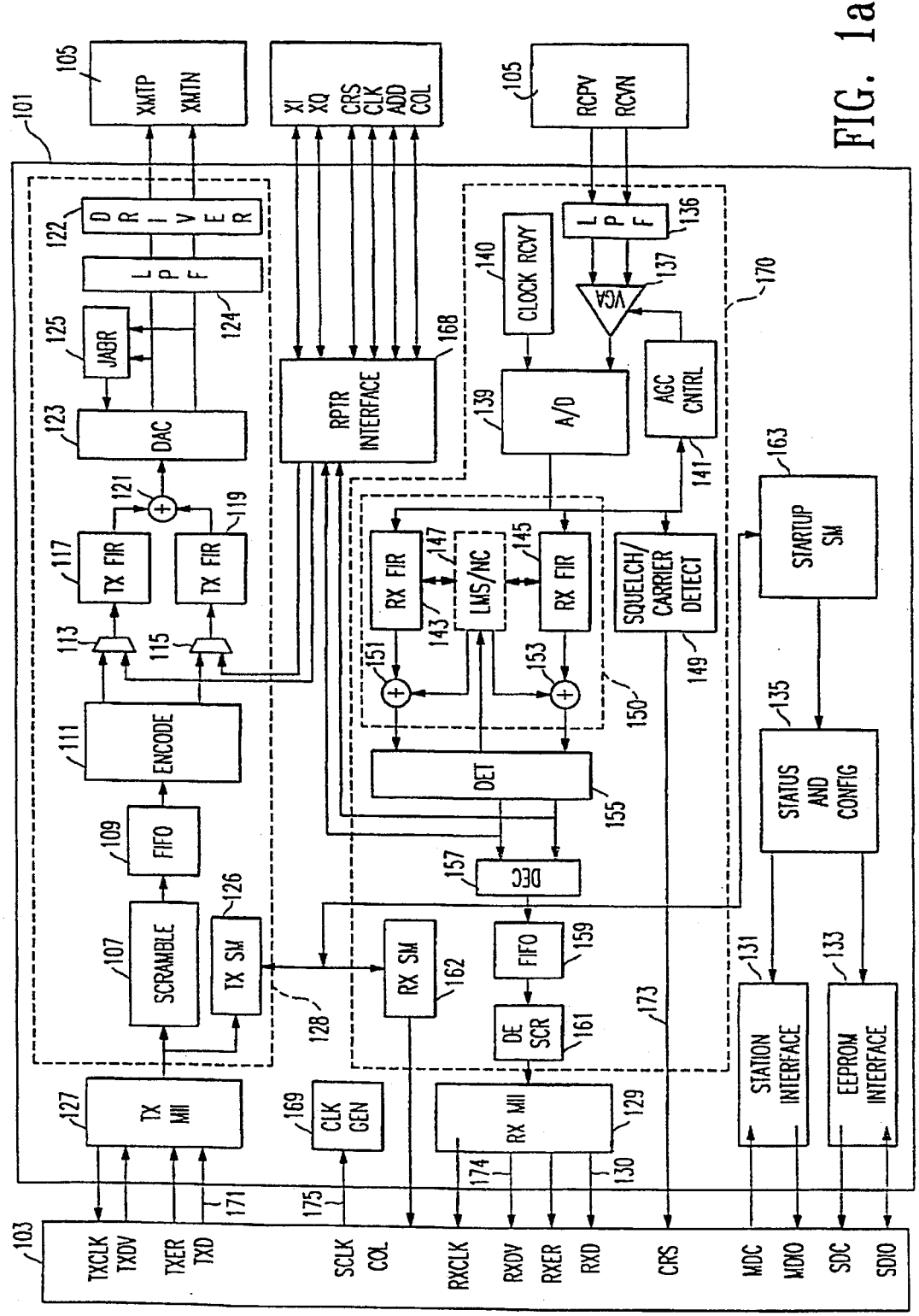
FIG. 1a is block diagram of a system in accordance with one embodiment of the present invention.

FIG. 1a is a block diagram of a transceiver 101 in accordance with the present invention coupled to a media access control unit (MAC) 103, each within a first station in a network, the first station being coupled to another station 105 in the network. The transceiver includes four sections; a Receiver, a Transmitter, a Media Independent Interface (MII), and a miscellaneous section.

Overview

In accordance with the present invention, in addition to CAP constellation points being assigned to represent data patterns, particular periodic patterns of CAP symbols are used to communicate overhead. For example, idle symbols comprising an idle pattern can be transmitted when there is no data being transmitted to allow the receive clock in a transceiver receiving the idle symbols to remain synchronized with the transmit clock in a transceiver transmitting the idle symbols. The idle pattern in accordance with preferred embodiment of the present invention is a periodic sequence of idle symbols represented by CAP constellation points. In particular, in the preferred embodiment, the idle pattern alternates between a first and a second CAP constellation point. Also, preamble symbols may be transmitted which indicate that the beginning of a data frame is forthcoming. Other such overhead symbols are discussed below. The use of periodic sequences of CAP constellation points to communicate overhead symbols allows the same hardware to modulate (and encode) and demodulate (and detect) both data and overhead symbols.

The Transmitter 128 includes a scrambler 107, a first-in/first-out memory (FIFO) 109, an encoder 111, a first and a second multiplexer 113, 115, a first and a second transmit finite impulse response (FIR) filter 117, 119, a summing circuit 121, a digital-to-analog converter (DAC) 123, a Jabber detection circuit 125, a transmitter state machine 126, a low pass filter (LPF) 124, and a driver 122. The MII section includes a transmit MII 127, a receive MII 129, a station management interface 131, an EEPROM interface 133, and a status and configuration circuit 135. The receiver 170 includes a variable gain amplifier (VGA) 137, an analog to digital converter (A/D) 139, a clock recovery circuit 140, an automatic gain control (AGC) circuit 141, an equalizer 150 comprising a first and second receive FIR filter 143, 145, and a least mean square (LMS)/near-end cross-talk circuit (NC) 147, a squelch/carrier detect circuit 149, a first and second summing circuit 151, 153, a detector circuit 155, a decoder circuit 157, a FIFO 159, a descrambler 161, and a receiver state machine 162. The miscellaneous section includes a startup circuit 163, a joint test action group (JTAG) 165, a light emitting diode (LED) control circuit 167, a repeater interface circuit 168, and a clock generator 169.

The scrambler 107 manipulates data received from the transmit MII 127 to ensure that the appropriate number of transitions occur in the data stream to be transmitted, as required by transmission standards such as V.31. The data is then buffered in the transmit FIFO 109. The encoder 111 receives the digital information to be transmitted and maps each group of five bits into an output symbol which is presented to the FIR filters 117, 119 through multiplexers 113, 115. The encoder 111 also monitors the state of the transmitter and injects appropriate symbol sequences to be output during states of the transmitter other than the data transmission state. An FIR filter 117, 119 associated with each component (in-phase and quadrature) shapes the in-phase and quadrature components. Alternatively, the multiplexers 113, 115 can select symbols generated by the repeater interface 168 to signal a jam condition.

The in-phase and quadrature components of the symbols output from the FIR filters 117, 119 are combined and in a summing circuit 121 and applied to the DAC 123. The DAC converts the digital signals which represent the symbols to analog format. The signals pass through a low pass reconstruction filter 124 having an output which is preferably coupled to the driver 122. A jabber detection circuit is provided to monitor the duration of the transmitter activity and to detect malfunction when the duration exceeds a threshold set by Ethernet standards.

Signals are received in the transceiver and coupled to the VGA 137. Gain of the VGA 137 is controlled by the AGC control circuit 141. The VGA 137 has four modes of operation, the first of which is mutually exclusive with the second, and the third of which is mutually exclusive with the fourth. The output of the VGA 137 is coupled to the input of the A/D 139. The A/D 139 converts the analog signal into a digital representation of the analog signal. The A/D converter 139 preferably operates at a rate of three times the symbol rate (e.g., 3×20 million; or 60 million samples per second). In one embodiment, a 60 MHz clock is provided to the A/D converter 139 by the clock recovery circuit 140. The output of the A/D 139 is coupled to the input to the in-phase receiver FIR filter 143, a quadrature receiver FIR filter 145, and a squelch/carrier detect circuit 149. The squelch/carrier detect circuit 149 is capable of determining directly whether a preamble is present on the incoming signal line. Presence of a preamble causes the carrier sense (CRS) signal 173 to be asserted.

The in-phase receiver FIR filter 143 extracts the quadrature component from the received signal. Likewise, the quadrature receiver FIR filter 145 extracts the in-phase component from the received signal. The LMS/NC circuit 147 cancels near end cross talk, and equalizes the signals for distortion and interference. The quadrature and in-phase signals are provided to the detector 155. The detector 155 determines transitions between receiver modes, determines which constellation point on the CAP 36 constellation the received signal represents, produces error signals for equalizer filter adaptation, and provides metrics used to monitor receiver performance.

The decoder 157 receives the output from the detector 155 and generates a bit stream that is essentially equal to the data encoded by the far-end transmitter. This bit stream is buffered in the receiver FIFO 159. The output from the FIFO 159 is coupled to the input of the descrambler 161. The descrambler 161 returns the data to essentially the condition the data was in at the input to the scrambler 107 (i.e., decodes any inversions created to ensure that the required number of transitions occurred). The output of the decoder 161 is coupled to the receiver MII 129.

The transmitter and receiver MII 127, 129 interface the transceiver to the MAC 103. Such interfaces are well known in the art (e.g., IEEE standard 802.3 interface). In addition, the station interface 131 has a simple two wire interface defined by IEEE 802.3u MII supplement and provides for bidirectional communication between the physical layer and a station management entity in known fashion. Further, the EEPROM interface 133 provides an interface to read and write information into an electrically erasable programmable read only memory (EEPROM) (not shown).

Figure 1B:
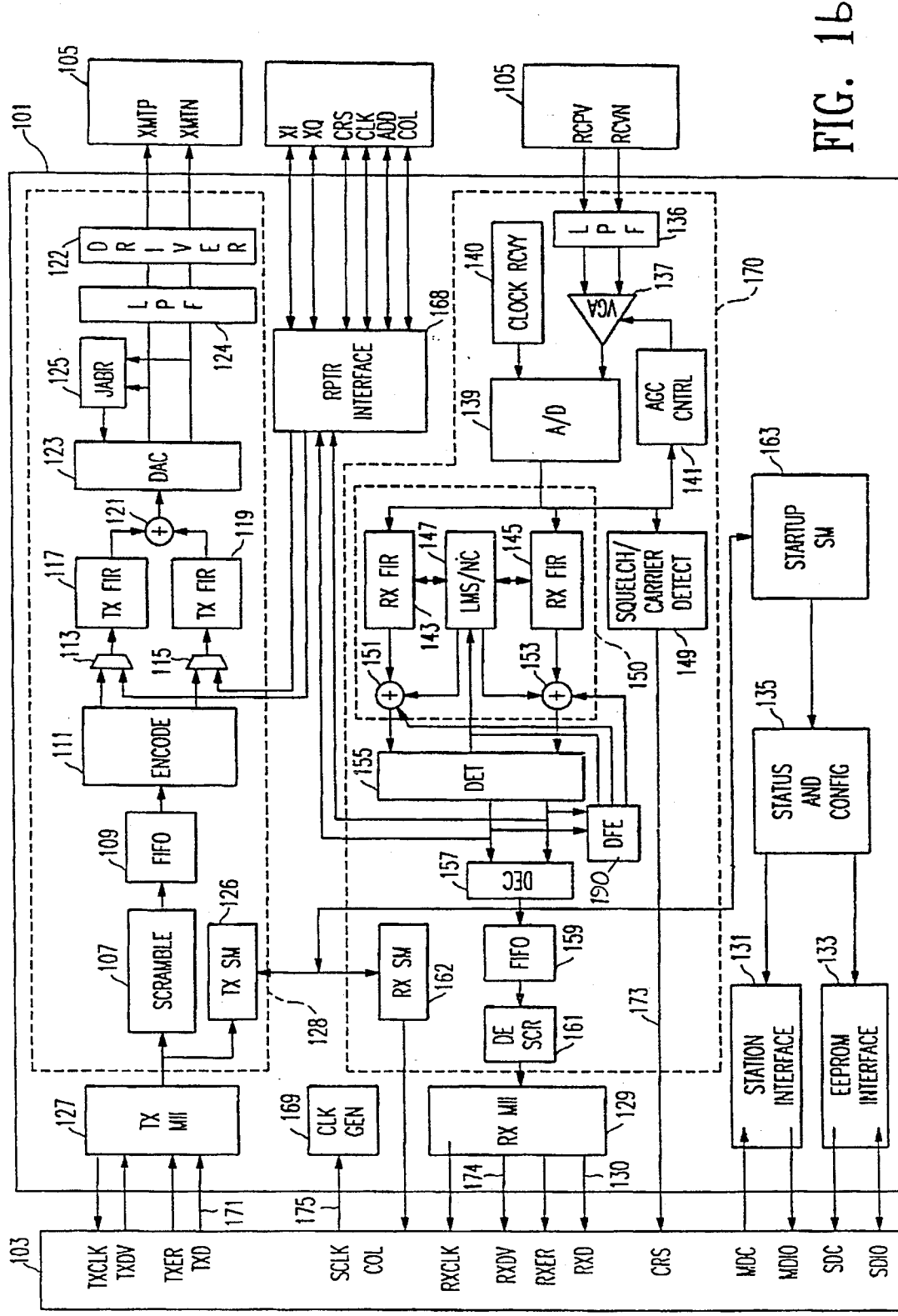
FIG. 1b is block diagram of a system in accordance with an alternative embodiment of the present invention.

In an alternative embodiment of the present invention shown in FIG. 1b, the input of a decision feedback equalizer (DFE) 190 is coupled to the output from the detector, and the output of the DFE 190 is coupled to additional inputs to the summing circuits 151, 153. This configuration may be advantageous for use as the transceiver within a repeater. The DFE 190 provides cancellation of cross talk that results when the receive and transmit lines of a plurality of stations are all bundled together, as may be the case when a multi-conductor cable is routed from one repeater to a plurality of stations. Details of the operation of the DFE 190 are provided below.

Details of Transmitter

Figure 2:
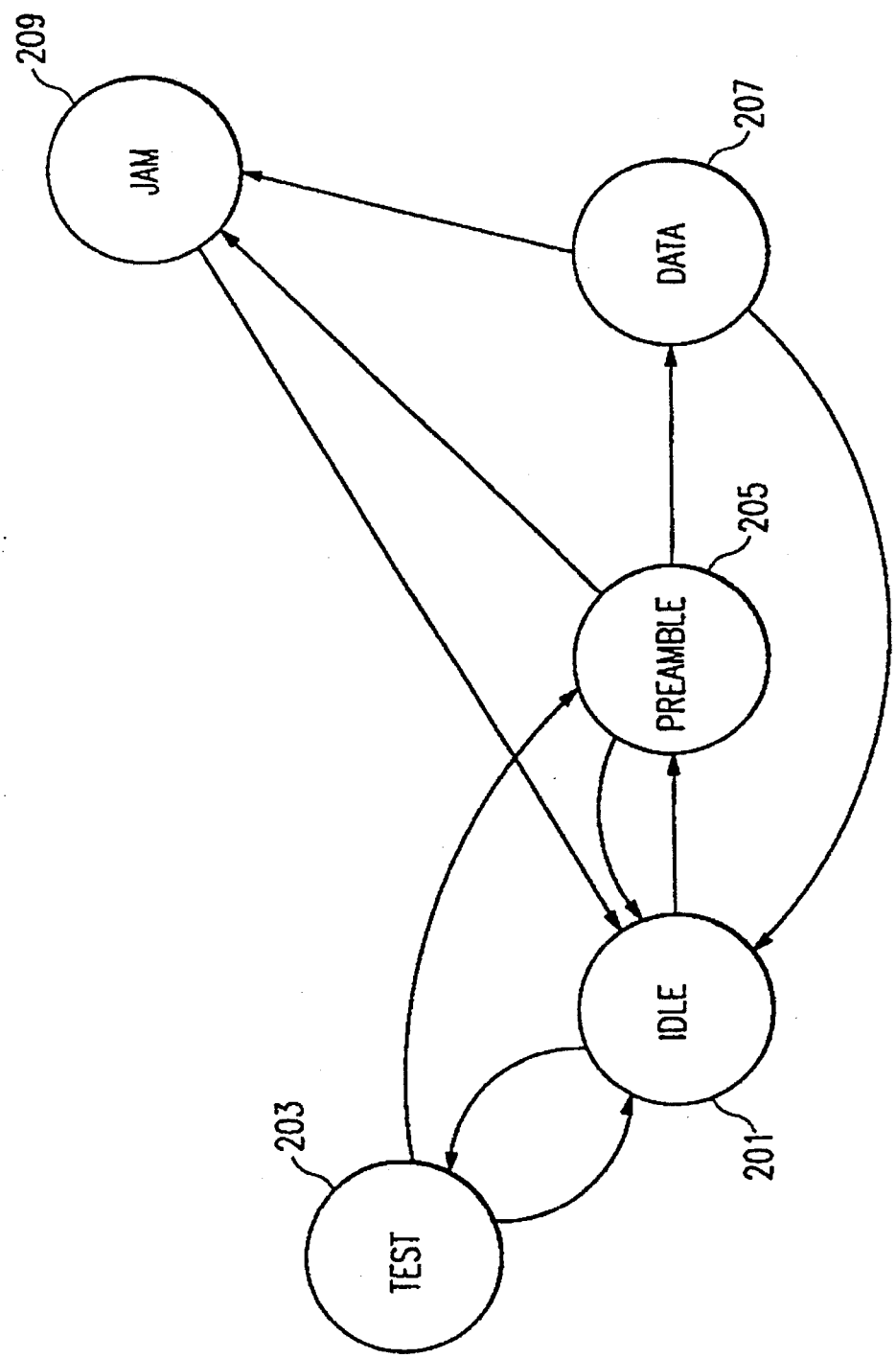
FIG. 2 is a state diagram of the transmit state machine in accordance with the present invention.

The transmitter state machine 126 continuously monitors the transmit data line (TXD) 171, the transmit enable line (TXEN), and the CRS 173. The TXEN is a signal generated by the MAC 103. FIG. 2 is a state diagram of the transmit state machine 127. The state of the transmitter is important to synchronize the scrambler 107 and FIFO 109 with the encoder 111 activities to ensure that signalling information is properly encoded in the symbol stream and that there is no loss of data in the bit stream. State transitions preferably occur synchronous to the MII (in one example, at 25 MHz octet boundaries) and are synchronized with symbol generation (which occurs at 20 MHz in on embodiment of the present invention).

Assuming that the transmitter state machine 127 is in IDLE STATE 201, the transmitter state machine 127 may transition to either TEST STATE 203 or PREAMBLE STATE 205. A transition to TEST STATE 203 is made upon receipt from another station on the network of a request to transmit a test pattern. In one embodiment of the present invention, the remote receiver transmits an idle violation code to request a test pattern from the local transmitter. Detecting an idle violation code will notify the local transmitter that a request has been issued.

Alternatively, the local transmitter monitors the duration of inactivity and when the transmitter is inactive for more than a predetermined amount of time, a test pattern is transmitted. A transition to PREAMBLE STATE 205 is made whenever a preamble symbol is received by the transmitter MII 127 over the TXD 171 and the TXEN is asserted. The transmit enable is asserted by the MAC 103 which transmits a signal to the transmitter MII 127 upon a transmit packet request and the transmitter being IDLE.

Upon entering TEST STATE 203, the transmitter state machine 126 may reenter IDLE STATE 201 at the end of the normal test cycle, or may enter PREAMBLE STATE 205 if a preamble appears on the TXD 171. Thus, the fact that the transmitter is in TEST STATE 203 will not preclude the transmitter from transmitting data.

Upon entering PREAMBLE STATE 205, the transmitter state machine 126 continues to monitor the TXEN to ensure that the TXEN remains asserted. If at any time during PREAMBLE STATE 205, the TXEN is deasserted, the transmitter state machine 126 reverts to IDLE STATE 201. In addition, if the TXD 171 contains a "00" pattern (i.e., two zero bits in succession) or a "11" pattern that is not consistent with the start of time delimiter (SFD), then the transmitter state machine 126 reverts to IDLE STATE 201. From PREAMBLE STATE 205, the state machine can also transition to DATA STATE 207, during which data is received by the transmitter MII 127 and transmitted onto the network, as will be discussed in greater detail below. Once all the data is transmitted, the transmitter state machine 126 transitions to IDLE STATE 201. However, if the transmitter determines that the far end station is attempting to transmit (i.e., a preamble is detected by the receiver), then the transmitter state machine 126 transitions to JAM STATE 209. A jam occurs when more than one station attempts to send information on the network at the same time. Alternatively, a jam occurs when two stations attempt to send data to one repeater at the same time. (A discussion of repeaters and the operation of transceivers within repeaters is presented later). In such a case, a jam condition is signaled by the repeater interface 168 directly through the multiplexers 113, 115, or by the station that detects the jam condition. The data that is being output from the encoder 111 is ignored. From JAM STATE 209, the transmitter state machine 126 can only enter IDLE STATE 201.

In IDLE STATE 201, the encoder outputs the symbols used to generate the pattern that indicates an IDLE STATE 201 condition. In accordance with the preferred embodiment of the present invention, this pattern is generated by alternating between two of the inner most points of the CAP 36 constellation, preferably in opposing quadrants (i.e., the amplitude of each component of the first point is the negative of the amplitude of the corresponding component of the second point). A diagram of the CAP 36 constellation is provided in FIG. 3. A first axis 303 represents the amplitude of the in-phase component of the output signal transmitted by the transceiver over the network. Points to the right of the origin 305 have positive amplitudes, and point to the left of the origin 305 have negative amplitudes. A second axis 304 represents the amplitude of the quadrature component of the signals to be transmitted by the transceiver. Points above the origin 305 have positive amplitudes, and points below the origin have negative amplitudes.

In the preferred embodiment of the present invention, points 301, 302 are used to generate a pattern ("IDLE pattern") that signals that the transmitter is in IDLE STATE 201. These particular points have been selected for the following reasons. The amplitude of the pattern generated by alternating between these points 301, 302 is relatively low. Therefore, the amount of cross talk generated in wires adjacent to the wires on which this pattern is transmitted will be minimized. Furthermore, by alternating between these two points, the pattern that is generated has a frequency that is approximately half the symbol rate (e.g., in fast ethernet, the symbol rate is 20 MHz; accordingly, the tone frequency is 10 MHz). Thus, since cross talk is proportional to the frequency of the signals which generate the cross talk, the IDLE pattern will generate less cross talk than would be generated if some other point or combination of points were used which generated a tone that had a higher frequency.

The IDLE pattern is preferably generated directly by the encoder 111. That is, the encoder does not receive any information from the transmitter FIFO 109 during IDLE STATE 201. The encoder 111 outputs a first data stream that represents the in-phase component of the IDLE pattern, and a second data stream that represents the quadrature component of the IDLE pattern. The in-phase data stream and the quadrature data stream are each coupled to a respective one of the two multiplexers 113, 115. The multiplexers 113, 115 are each controlled during IDLE STATE 201 to couple the outputs from the encoder 111 to the inputs of the transmitter FIR filters 117, 119. Each of the transmitter FIR filters 117, 119 are fixed coefficient (i.e., non-adaptive) FIRs. However, the coefficients may be altered during initialization of the transceiver 101. Alternatively, the filters 117, 119 may be adaptive. In the preferred embodiment, each filter has 15 taps, T/4 fractional spacing, 3-bit wide inputs, 13-bit coefficient precision, output scaling, and an 8-bit wide output. In one embodiment of the present invention, the in-phase and quadrature components are input to the filters are 4-bit two's compliment values in the set {+/−1, +/−3, +/−5}. That is, each 4-bit value represents one of the six possible amplitude levels available to the corresponding component within the CAP 36 constellation. The 12 taps correspond to a memory span of four symbols. In the preferred embodiment of the present invention, the filter response is a square root raised cosine 50% rolloff. The filter output is computed according to the following equation:

$$Y_n = \sum_{k=0}^{N-1} t_{n-k} \cdot X_k$$

where symbols are indexed with the letter "k", and "n" is the number of taps, $Y_n$ is the output of the FIR filter at the n-th iteration (sample, instance), and "t" is the input symbol to the FIR filter.

The summing circuit 121 receives the output from each FIR filter 117, 119 and subtracts the output of the quadrature filter 119 from the output of the in-phase filter 117. The difference is presented to the DAC 123. The DAC 123 converts the digital signal to an analog signal in conventional fashion. The analog signal is driven on the network by a conventional analog driver circuit 128.

In TEST STATE 203, the present invention preferably outputs a TEST pattern that comprising a pseudo random sequence of inner constellation points 301, 302, 306, 307. The TEST pattern is preferably generated by the encoder 111 directly. That is, the encoder 111 is signalled that the transmitter is in TEST STATE 203. In response, the encoder 111 generates a digital output which at the output of the FIR filters 117, 119 is equal to the TEST pattern. The TEST pattern is used to train the receiver filters included within the station that requested the TEST pattern. Training is performed in known fashion. Use of the inner most points 301, 302, 306, 307 of the constellation reduce the energy that is transmitted during TEST STATE 203. Thus, the amount of cross talk due to the TEST pattern is reduced.

In PREAMBLE STATE 205, the present invention preferably outputs a PREAMBLE pattern which alternates between a first and a second of the outer most points in the CAP 36 constellation. For example, in one embodiment of the present invention, the PREAMBLE pattern alternates between the points 308, 310. These points 308, 310 provide the maximum amplitude at a relatively low frequency (half the symbol rate; e.g., 10 MHz for fast ethernet) and thus reduces the effects of cross talk received on the receiver lines. The use of these points also makes the resulting PREAMBLE pattern easy to detect. The encoder 111 outputs the data required to generate the PREAMBLE pattern upon receiving a preamble from the transmitter MII 127 through the scrambler 107 (which is disabled during PREAMBLE STATE 205) and the FIFO 109. The preamble is preferably a predetermined pattern of bits which can be recognized by the encoder. In the preferred embodiment, the preamble received by the encoder 111 is a repeating pattern of 64-bits alternating between ones and zeros (i.e., "1010 . . . 1010").

In accordance with the preferred embodiment of the present invention, the last two bits of the last preamble symbol (i.e., the last two bits of the last 8-bit pattern) are "11". This ensures that the encoder 111 will distinguish the beginning of the data from the preamble. This last symbol of the PREAMBLE STATE 205 is referred to as a Start of Frame Detection symbol (SFD). The SFD is encoded as one of two points on the CAP 36 constellation. These two points used to encode the SFD are preferably distinct from the two points used to encode the previous portion of the preamble. In addition to serving as a preamble delimiter, the SFD determines the state of the first bit of digital data. That is, the particular symbol used to encode the SFD will determine whether the first bit is a one or a zero. For example, in the preferred embodiment, one of the two points 312, 314 at the outer corners opposite the two points 308, 310 are used to encode the SFD. Use of these points 312, 314 provides a symbol in which the amplitude of each of the components is as distinct from the components of the other symbols used in the preamble as is possible within the limits of the CAP 36 constellation. Thus, the SFD will be easily detected by the receiver. After receipt of the SFD, the transmitter enters DATA STATE 207. It should be noted that the first bit of data is encoded in the SFD and accordingly transmitted in PREAMBLE STATE 205, not DATA STATE 207.

In DATA STATE 207, the present invention transmits data encoded using 32 of the 36 symbols available in the CAP 36 constellation. In accordance with the preferred embodiment of the present invention, the inner most four points 301,302, 306, 307 are not used to encode valid data. Thus, the 32 possible combinations of five bits of binary data can be encoded. That is, each data symbol will represent five bits of digital data. Table 1 illustrates the bit pattern represented by each combination of in-phase and quadrature components.

TABLE 1

| I/Q | −5 | −3 | −1 | +1 | +3 | +5 |
|-----|-------|-------|-------|-------|-------|-------|
| +5  | 10111 | 10011 | 10101 | 00101 | 00011 | 00111 |
| +3  | 10110 | 10010 | 10001 | 00001 | 00010 | 00110 |
| +1  | 10100 | 10000 | 1000x | 0000x | 00000 | 00100 |
| −1  | 11100 | 11000 | 1100x | 0100x | 01000 | 01100 |
| −3  | 11110 | 11010 | 11011 | 01001 | 01010 | 01110 |
| −5  | 11111 | 11011 | 11101 | 01101 | 01011 | 01111 |

If the transceiver determines that a preamble has been received by the local receiver (i.e., the CRS 173 is asserted) during transmission of either data or the SFD, then the transmitter state machine 126 transitions to JAM STATE 209.

In JAM STATE 209, the transmitter ceases transmission of data and instead transmits a jam symbol sequence. In the preferred embodiment of the present invention, a jam symbol sequence includes an alternating pattern of the inner most and outer most corners within a single quadrant of the CAP 36 constellation. For example, the jam symbol sequence is preferably an alternating pattern between the points 301 and 314. Since the point 301 should never be transmitted during DATA STATE 207, the repeated receipt of this point during data reception repeatedly followed by the point 314 indicates a jam condition. In accordance with the preferred embodiment of the present invention, the jam sequence is transmitted for a predetermined time, such as 6 symbols, after which the receiver transitions back to IDLE STATE 201.

Details of Receiver

The receiver of the preferred embodiment of the present invention receives the signal over a two wire twisted pair, similar to the twisted pair used by the transmitter. The receive twisted pair is coupled to the differential inputs of a conventional low pass filter 136 having a cut-off of approximately 37.5 MHz. The differential output of the low pass filter 136 is coupled to a differential input to the VGA 137. The gain of the VGA is controlled by the AGC controller circuit 141.

Figure 4A:
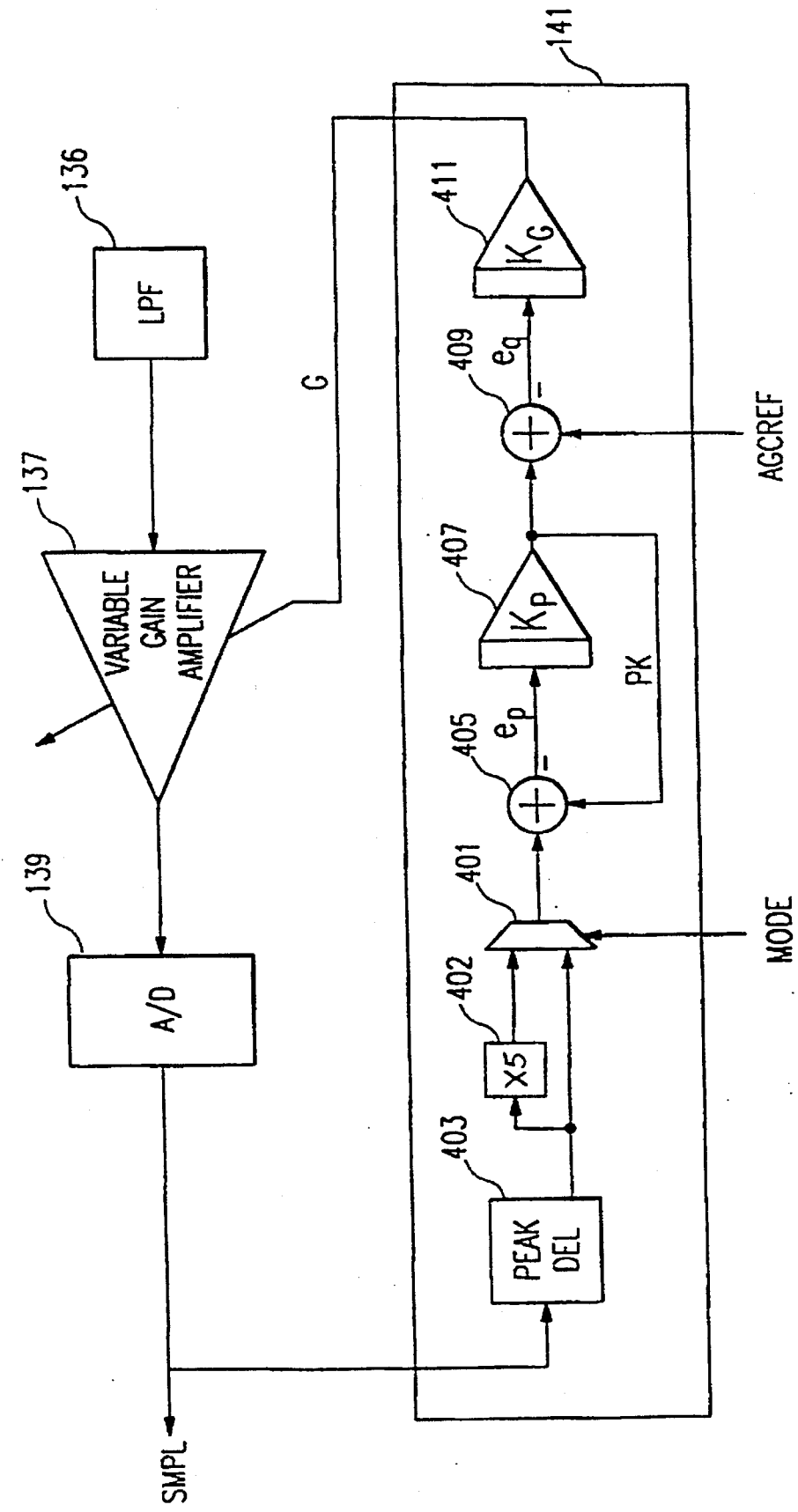
FIG. 4a is a block diagram of the AGC controller circuit in accordance with the present invention, illustrating the interaction of the AGC controller circuit with the VGA and the A/D.

FIG. 4 is a block diagram of the AGC controller circuit 141, illustrating the interaction of the AGC controller circuit 141 with the VGA 137 and the A/D 139. In accordance with the preferred embodiment of the present invention, the gain of the VGA 137 is controlled by a servo loop which includes the A/D 139 and the AGC controller circuit 141. Data output by the A/D 139 is monitored by a peak detector circuit 403 which maintains a record of the largest input magnitude of a given period. The output of the peak detector circuit 403 is coupled to a first input to a multiplexer 401 and to a multiplier circuit 402. The output of the multiplier circuit 402 is coupled to a second input to the multiplexer 401. The output of the multiplexer 401 is coupled to a summing circuit 405. Thus, the multiplexer 401 may select to directly couple the output of the peak detector circuit 403 to the summing circuit 405 or may route the output of the peak detector circuit 403 through the multiplier circuit 402. In the preferred embodiment of the present invention, the multiplier circuit 402 multiplies a signal by five. The output of the summing circuit 405 is coupled to a first amplifier block 407. The output of the first amplifier/integrator block 407 is coupled to a subtraction input of the summing circuit 405. Thus, the output of the first amplifier/integrator block 407 is subtracted from the output of the multiplexer 402. A first input to a second summing circuit 409 is coupled to the output of the first amplifier/integrator block 407, and a second input to the second summing circuit 409 is coupled to an AGC reference signal. By adjusting the AGC reference signal the gain curve of the servo loop can be adjusted. In accordance with the preferred embodiment of the present invention, the AGC reference level is set at startup. However, the AGC reference signal level may be reestablished during operation by the station interface 131. The output of the second summing circuit 409 is coupled to the input of a second amplifier/integrator circuit 411. The result of the summing circuits 405, 409 and amplifier/integrator circuits 407, 411 is to average the peak signal values and set the gain of the VGA 137 to maintain a relatively constant average peak signal level. The output of the AGC controller circuit 141 is one of 16 discrete values. Accordingly, the gain of the VGA can be one of 16 values.

In a first mode (CONTINUOUS GAIN CONTROL (CGC) MODE) the peak detector circuit 403 maintains a "leaky" sample of the largest absolute value recorded. That is, the magnitude of the largest input to the peak detector circuit 403 decays (or is reduced) at a predetermined rate. The rate of decay in the preferred embodiment is approximately the time required to receive 1000 symbols. Each sample period, the current sample is compared with the value of the reduced recorded sample. If the magnitude of the current sample is greater than the magnitude of the current recorded value, the current sample is recorded and begins to decay at the predetermined rate.

If the current sample is not greater in magnitude than the recorded sample, then the recorded sample is reduced by an amount proportional to the difference between the recorded value and the magnitude of the current sample. Accordingly, during CGC MODE updates to the recorded value are made each sample regardless of whether the current sample is greater than or less than the recorded sample. Therefore, averaging and error integration is performed on a sample by sample basis. Updates to the recorded sample cease upon detection of a collision (i.e., the local transmitter is or becomes active during receipt of data or preamble).

In a second mode (FRAME-RATE GAIN CONTROL (FGC) MODE) the recorded peak value in the peak detector 403 is cleared at the beginning of each frame (i.e., upon the start of DATA MODE or TEST MODE). Typically, a frame comprises a preamble (which may comprise a predetermined pattern of bits) and data (substantive information, as opposed to overhead, which is to be communicated to another station). Such a frame is referred to as a "data frame". However, in the present context, a frame may also include a series of test symbols. This is referred to as a "test frame". The peak detector value is then updated for each sample within a frame only if the current sample is greater than the recorded sample. In FGC MODE, the recorded sample maintains value (i.e., does not decay). Thus, averaging and error integration is performed on a frame by frame basis during FGC MODE. The gain of each amplifier/ integrator block 407, 411 is greater during CGC MODE than during FGC MODE. The lower update rate, together with the lower servo loop gains increases the time constant (i.e., slows the slewing of the VGA) during FGC MODE. CGC is preferably used to accelerate convergence of the AGC without concern that the loop gain will be too great, since the receive signal is controlled during the training procedure implemented during startup, as is described below.

In a third mode (DATA MODE) the multiplexer 401 causes the output of the peak detector circuit 403 to be directly coupled to the summing circuit 405. In a fourth mode (NON-DATA MODE) the multiplexer 401 routes the output of the peak detector 403 through the multiplier 402. NON-DATA MODE is used when receiving either test or idle symbols. Since non-data symbols are preferably at the lowest amplitude levels (i.e., in-phase and quadrature components have the least amplitude) the multiplier 402 compensates for the difference in average peak signal amplitude between non-data symbols and data symbols.

Control of the mode selection in the AGC controller circuit 141 is made by the receiver state machine 162. In DATA MODE the multiplexer 401 selects the input which directly couples the output of a peak detector 403 to the summing circuit 405.

The A/D converter 139 is preferably a flash analog-to-digital converter with a true 8-bit resolution at its output. The sample rate is preferably approximately 60 million samples per second (60 Ms/s), as determined by the clock provided to the A/D converter 139 by the clock recovery circuit 140. Symbols are received at 20 million symbols per second. Accordingly, there are three samples taken for each symbol. The A/D converter 139 preferably has an on-line auto-calibration mode and a block auto-calibration mode. The on-line mode allows individual comparators to be zeroed, one per clock, during conversion processes. This strategy results in a random probability of 1/256 every symbol that the output will be skewed by 1 least significant bit because the specific comparator was busy being calibrated when needed to generate the output. This will have a negligible impact on the noise level of the receiver.

In block auto-calibration mode, the entire A/D converter 139 is calibrated at the end of each data frame and at the end of each test sequence.

The output of the A/D converter 139 is then coupled to the inputs of the receiver FIR filters 143, 145, and the squelch/ carrier detect circuit 149. In accordance with the preferred embodiment of the present invention, the LMS/NC circuit 147 includes two FIR filter having 1 tap each, 1 data input, 10-bit coefficient width, output scaling of $2^{-4}$, an 8-bit output width, an 8-bit error width, and an adaptive gain of $2^{-6}$. The LMS/NC circuit 147 operates to cancel the near-end cross talk as follows. Since the near end cross talk is an IDLE pattern, the LMS/NC circuit 147 need only deal with the in-phase component having a unit amplitude of +/−1. Likewise, the quadrature component has a unit amplitude of −/+1. In accordance with one embodiment of the present invention, the output of the LMS/NC circuit 147 is equal to:

$$b_{N,F} = S_{HC} B_r) - 1)^N$$

where S is the output scaling factor, $B_r$ are the filter coefficients, and data input is indicated as $(-1)^k$. The IDLE pattern at the output of the receiver FIR is an additive alternating sign vector very slowly rotating, the LMS/NC circuit 147 estimates the in phase and quadrature components of that vector with its alternating sign and subtracts it from the receiver FIR outputs, thus cancelling the near end cross talk interference.

In accordance with the preferred embodiment of the present invention, the coefficients are updated alternatively, one per symbol period, according to the following formula:

$$b_{r,k} = B_{r,k-1} + \mu_{HC} \cdot E_{r,k} \cdot (-1)^k$$

where the NEXT cancelled input d serves as the error signal to the LMS/NC circuit 147, and $\mu_{NC}$ is the adaption gain.

Alternatively, the coefficients of the NEXT canceler within the LMS/NC circuit 147 may determined by a lookup table. In the case of the present invention, the lookup table need only have one entry, since the transmit signal which causes the cross talk to be cancelled is known to have an amplitude alternating between plus and minus one referenced to the CAP constellation.

The FIR filters 143, 145 are two nearly identical adaptive FIR filters. The LMS/NC input, d, is input to both filters 143, 145 at the same time, at the 60 MHz sample rate. Each filter 143, 145 has 21 taps, 7 symbols, an 8-bit input width, a 13-bit precision coefficient, an 8-bit output width, and a 6-bit error width. The 18 taps correspond to a memory length of 6 symbol periods. There is no difference in the structure of these filters 143, 145, however the coefficient values may vary. The FIR filters 143, 145 are tasked with extracting out the in-phase and quadrature components from the input signal in known fashion. In addition, these filters 143, 145 perform line equalization to compensate for signal distortion due to line dispersion, temperature fluctuations, and inter-symbol interference. Accordingly, the output of the receiver in-phase FIR filter 143 is the in-phase component of the received symbol, and the output of the receiver quadrature FIR filter 145 is the quadrature component of the received symbol. The filter output is calculated according to the following:

$$r_k = S_{eq} \sum_{i=0}^{17} R_i d_{k-i}$$

where r is the filter output; S is the output scaling factor; $R_i$ are the filter coefficients; and d is the input to the filter. The symbols are indexed with "k". The coefficients are indexed with "i".

The coefficients are updated alternatively, each one every ninth symbol as follows:

$$R_{i,k+1} = R_{i,e} + \mu_{eq} \epsilon_k E_{k-1}$$

where $\epsilon$ is the error signal from the detector and $\mu$ is the adaptation gain.

The FIR filters may be in one of three different modes: (1) ADAPT MODE, in which coefficient adaptation takes place); (2) FREEZE MODE, in which coefficient adaptation is inhibited; and (3) INIT MODE, in which initial coefficient values are loaded from a fixed set of values. In accordance with the preferred embodiment of the present invention, the startup state machine 163 will transition the equalizer 150 from INIT MODE to ADAPT MODE. External control of these modes takes place through the receive MII 129. In accordance with one embodiment of the present invention, the FIR filters 143, 145 count the number of saturation events that occur due to excessive gain in the VGA 137 by counting, during the accumulation, overflow and underflow detected.

Figure 4B:
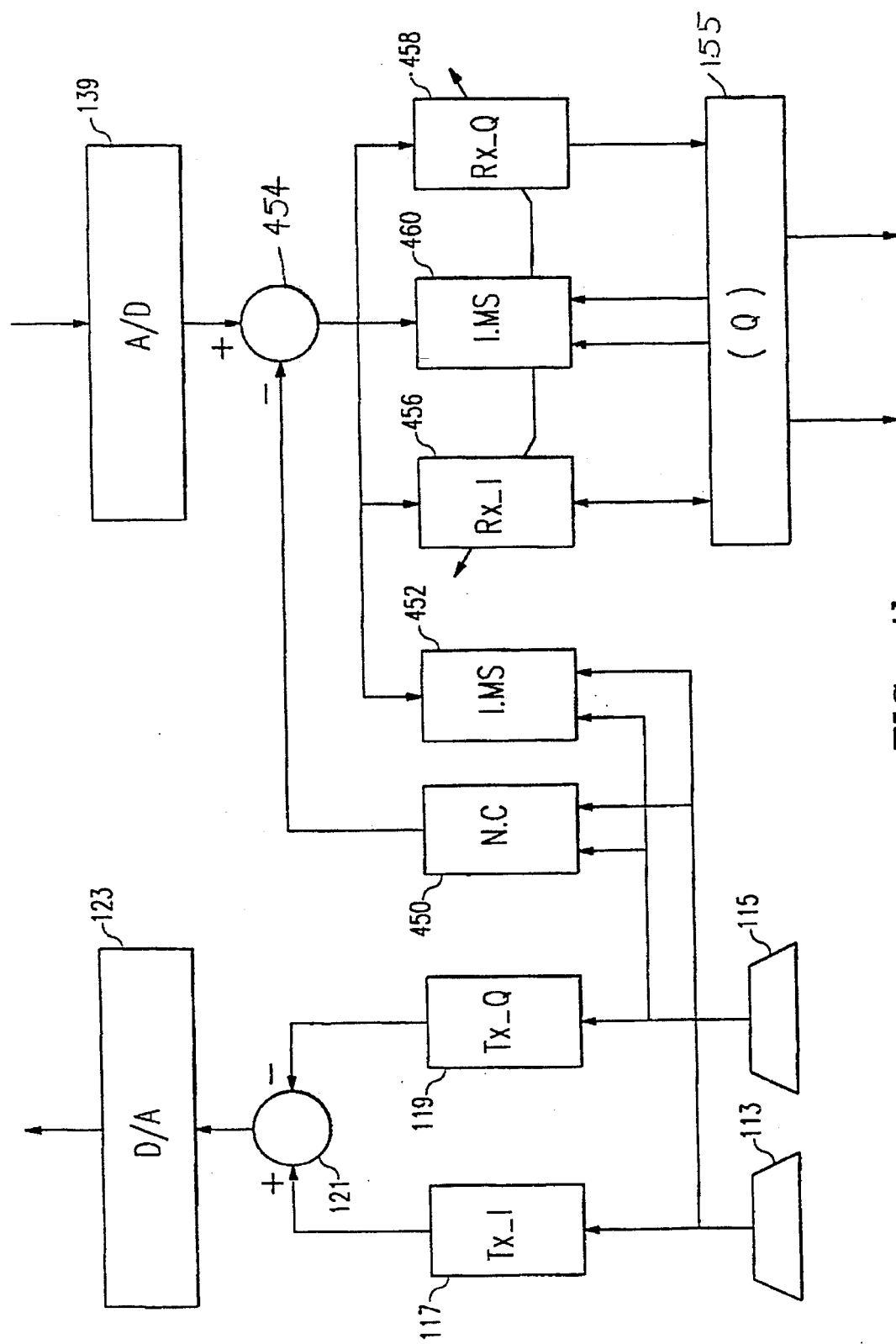
FIG. 4b is a block diagram of an alternative equalizer and NEXT canceler in accordance with the present invention.

FIG. 4b is a block diagram of an alternative embodiment of the present invention in which the each component of the transmitted signal is feed from the multiplexers 113, 115 into the receiver near end cross talk canceler 450 and a least mean square circuit 452, as well as into the transmitter filters 117, 119. The output of the near end cross talk canceler 452 is coupled to the inverting input of a summing circuit 454. The non-inverting input to the summing circuit 454 is coupled to the output of the A/D converter 139. Therefore the output from the transmitter (which generates the near end cross talk signal) is subtracted from the output of the A/D converter 139. The output from the A/D converter is also coupled to the input of the least mean square circuit 452. The least mean square circuit controls the filter characteristics to ensure that the proper amount of the transmitter signal is applied to the summing circuit 454. Receiver filters 456, 458 are controlled by least mean square circuit 460 to equalize the received signal at the output of the summing circuit 454. The least mean square circuit 460 is feed with control signals from the detector 155. Thus, it can be seen that the near end cross talk is subtracted prior to equalizing the received signal.

Figure 4C:
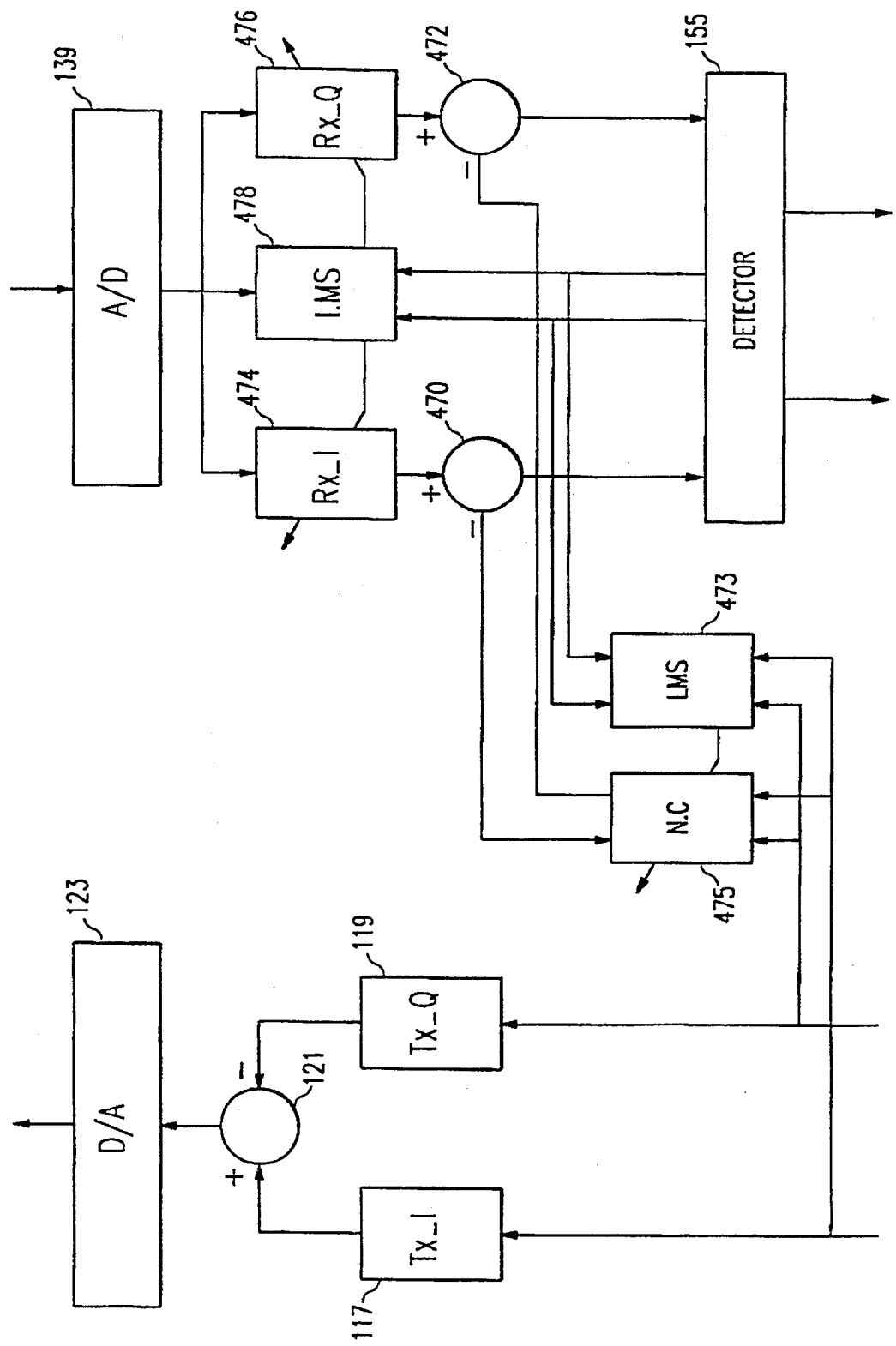
FIG. 4c is a block diagram of another alternative equalizer and NEXT canceler in accordance with the present invention.

FIG. 4c is a block diagram of another alternative embodiment of the present invention. In the embodiment of FIG. 4c, the signal components of transmitter are coupled to summing circuits 470, 472 which subtract the transmitter components after the receiver signal has been equalized by receiver filters 474, 476. A least mean square circuit 473 controls the parameters of an FIR filter 475 to determine the proper coupling of the transmitter components based on a signal output from the detector 155. A least means square circuit 478 controls the filters 474, 476 based upon the output from the detector 155 after the near end cross talk has been cancelled.

Figure 5:
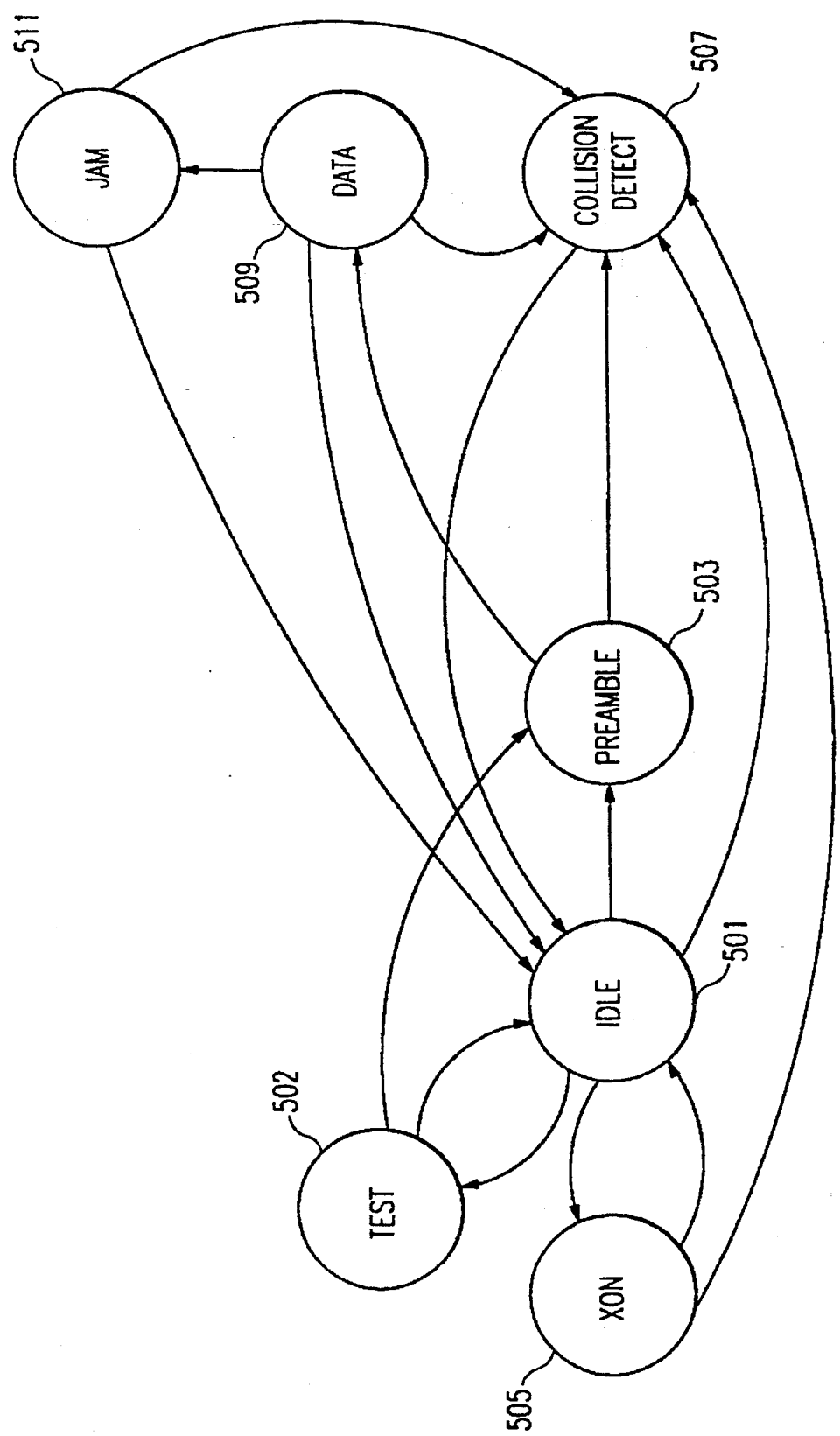
FIG. 5 is a state diagram of the states of a receiver in accordance with one embodiment of the present invention.

The receiver state machine 162 preferably controls the states of the receiver. FIG. 5 is a state diagram of the states of a receiver in accordance with one embodiment of the present invention. Assuming the receiver is in IDLE STATE 501, the receiver may transition to any one of four other states. For example, the receiver may transition to a PREAMBLE STATE 503 upon detecting receipt of a preamble symbol (e.g., in one embodiment of the present invention, either the point 308 or 310 of the CAP 36 constellation shown in FIG. 3). The receiver may also transition to TEST STATE 502 upon receipt of a test symbol. In one embodiment of the present invention, the test symbols include the inner most four points 301, 302, 306, 307 in the CAP 36 constellation shown in FIG. 3. In the preferred embodiment, the points 301 and 302 are idle symbols. Therefore, the receiver will transition from IDLE STATE 501 to TEST STATE 502 upon receipt of either of the test symbols (i.e.,points 306, 307 in the preferred embodiment). Alternatively, the receiver may transition to XON STATE 505. A transition to XON STATE 505 occurs when the receiver is in IDLE STATE 501 and the local transmitter (i.e., the transmitter within the same transceiver 101) begins transmitting a data frame (i.e., preamble and data). In the preferred embodiment, the transmitter generates a signal on a signal line "TXON") which indicates that the transmitter is active (i.e., is transmitting a data frame). The transmitter MII 127 generates the TXON signal upon receipt of TXEN. Lastly, the receiver may transition from IDLE STATE 501 to COLLISION STATE 507. The receiver preferably transitions from IDLE STATE 501 to COLLISION STATE 507 upon detection of two consecutive preamble symbols (e.g., points 308, 310) and the local transmitter begins transmitting preamble symbols after the second preamble symbol is received. In accordance with the preferred embodiment of the present invention, only one transceiver may send data at any one time.

Therefore, "collisions" are defined as the impermissible concurrent sending of data or preamble by two transceivers coupled to one another.

Once in the TEST STATE 502, the receiver in accordance with the one embodiment of the present invention may transition back to IDLE STATE 501 or to PREAMBLE STATE 503. A transition from TEST STATE 502 to IDLE STATE 501 preferably occurs after receipt of six consecutive idle symbols. Requiring that six consecutive idle symbols are received before transitioning to IDLE STATE 501 ensures that the far end transmitter (i.e., the transmitter sending the symbols) has transitioned to IDLE STATE 201 (see FIG. 2). Alternatively, the number of symbols may be greater or fewer.

Once in XON STATE 505, the receiver may either transition to IDLE STATE 501 or COLLISION STATE 507. A transition from XON STATE 505 to IDLE STATE 501 occurs when the local transmitter returns to IDLE STATE 201. A transition from XON STATE 505 to COLLISION STATE 507 occurs when the receiver receives two consecutive preamble symbols (e.g., points 308, 310).

The receiver can transition to PREAMBLE STATE 503 from either TEST STATE 502 or IDLE STATE 501. In either case, the transition occurs upon receipt of one preamble symbol. For example, in the preferred embodiment, receipt of a either the point 308, or the point 310 from the CAP 36 constellation shown in FIG. 3 will cause a transition from either TEST STATE 502 or IDLE STATE 501 to PREAMBLE STATE 503.

Once in PREAMBLE STATE 503, the receiver may either transition to DATA STATE 509 or COLLISION STATE 507. A transition to DATA STATE 509 occurs upon receipt of an SFD symbol (e.g., in the preferred embodiment of the present invention, either the point 312 or the point 314). As stated above, in the preferred embodiment, selection of one of two available SFD symbols will determine the state of the first data bit (i.e., "0" or "1"). Thus, the SFD serves double duty as both a data symbol and as a delimiter for the preamble. In an alternative embodiment, the SFD may be encoded using one of 16 different symbols. Accordingly, the SFD may be used to convey up to four bits of data. A transition from PREAMBLE STATE 503 to COLLISION STATE 507 occurs in response to the local transmitter sending a preamble symbol concurrent with the receipt of a preamble symbol at the receiver, as determined by monitoring the TXON to determine whether the local transmitter is active.

Figure 3:
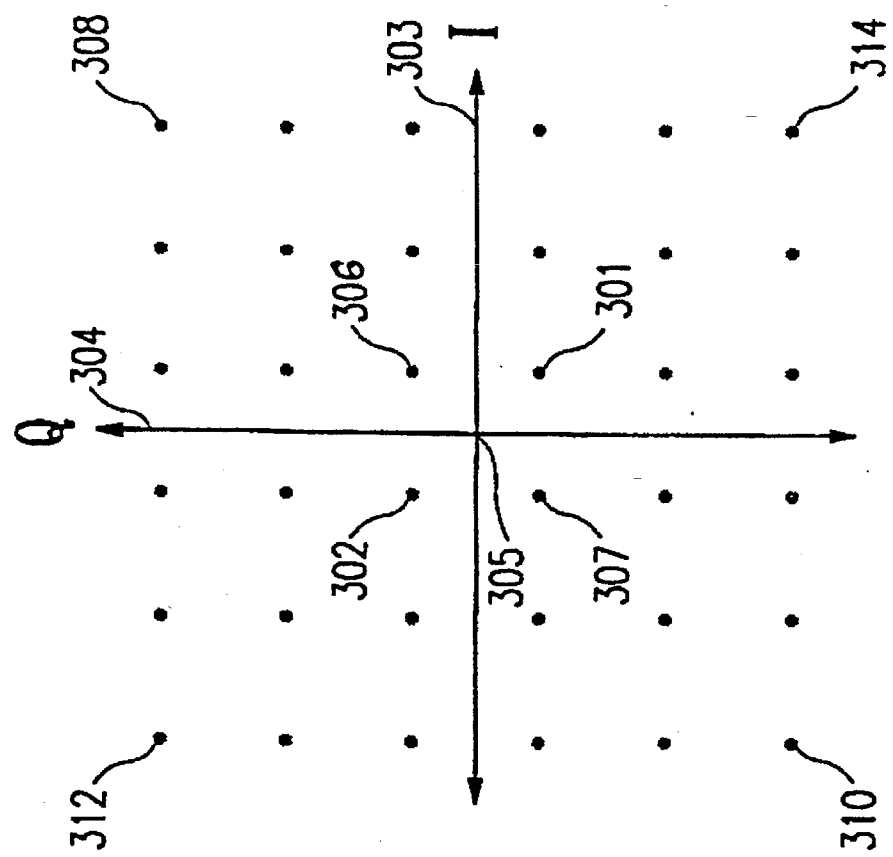
FIG. 3 is a state diagram of a CAP 36 constellation.

Once in DATA STATE 509, the receiver can transition to either IDLE STATE 501, COLLISION STATE 507, or JAM STATE 511. The receiver transitions from DATA STATE 509 to IDLE STATE 501 preferably upon receiving one idle symbol. The receipt of an idle symbols is interpreted in the preferred embodiment as an indication that the far-end transmitter has completed the data frame. In an alternative embodiment, additional idle symbols may be required to ensure that the far-end transmitter has completed the data frame. Also, in the preferred embodiment, the receiver may transition from DATA STATE 509 to COLLISION STATE 507 upon activation of the local transmitter as determined by assertion of TXON. Lastly, the receiver can transition to JAM STATE 511 in response to receipt of a jam symbol sequence. In the preferred embodiment of the present invention, the jam symbol sequence is an alternating pattern of symbols from the same quadrant of the CAP 36 constellation as shown in FIG. 3. In particular, the preferred embodiment the jam symbol sequence is a pattern which alternates between the points 314 and 301. In one embodiment of the present invention, the jam symbol sequence must be received a number of times in order to distinguish the jam symbol sequence from data which has been misinterpreted as being received as the point 301 (which is not assigned any data value, but which is interpreted as "0100x" in one embodiment of the present invention, where the "x" represents an ambiguity in the received data).

In COLLISION STATE 507, the receiver can transition to either IDLE STATE 501 or to DATA STATE 509. The receiver transitions from COLLISION STATE 507 to IDLE STATE 501 preferably upon receipt of an idle symbol (e.g., points 301 or 302 in the preferred embodiment). In an alternative embodiment, a number of idle symbols may be required to be received before transition to IDLE STATE 501 occurs. The receiver transitions from COLLISION STATE 507 to DATA STATE 509 upon the local transmitter returning to IDLE STATE 201 (see FIG. 2), followed by receipt of seven consecutive idle symbols (e.g., points 301 or 302 in the preferred embodiment).

Once in JAM STATE 511, the receiver can transition to either IDLE STATE 501 or COLLISION STATE 507. A transition from JAM STATE 511 to IDLE STATE 501 occurs upon receipt of six consecutive idle symbols (e.g., points 301 or 302 in the preferred embodiment). A transition to COLLISION STATE 507 occurs when the local transmitter becomes active during JAM STATE 511 (i.e., in the preferred embodiment, the TXON is asserted).

In accordance with the preferred embodiment of the present invention, the functions and outputs of the receiver are affected by the current state of the receiver. For example, in one embodiment of the present invention, the CRS 173 is asserted in each of the following states: (1) PREAMBLE STATE 503, (2) DATA STATE 509, (3) COLLISION STATE 507, and (4) JAM STATE 511. Also, a collision signal line (COL) is asserted in COLLISION STATE 507. In PREAMBLE STATE 503, DATA STATE 509, and COLLISION STATE 507, a received data valid line (RXDV) 174 is asserted by the receiver MII 129.

The LMS/NC circuit 147 and the AGC controller circuit 141 are each active only in TEST STATE 502 and DATA STATE 509. Clock recover (to be described in greater detail below) is enabled in each of the receiver states except XON STATE 505 and COLLISION STATE 507. Still further, the mode in which the detector 155 operates is determined by the receiver state.

The detector 155 receives fully equalized estimates of both the in-phase and the quadrature components of the received signals from the equalizer circuit 150. The detector 155 identifies which symbols the input signal represents (i.e., maps the amplitude of the in-phase and quadrature components to the symbols of the CAP 36 constellation). The detector is also responsible for tracking performance parameters (referred to as "metrics").

The detector 155 identifies which symbols have been received by determining within which of a predetermined number of amplitude ranges the amplitude of each component lies. The ranges associated with each symbol are determined by the particular mode the detector 155 is operating in, which is in turn determined by the receiver state. The amplitude ranges of the in-phase and quadrature components used by the detector 155 to determine which symbol has been received depend upon the "slicer modes" of the detector 155. In accordance with the preferred embodiment of the present invention, there are three slicer modes: (1) IDLE SLICER MODE, (2) PREAMBLE SLICER MODE; and (3) DATA SLICER MODE. The ranges associated with each slicer mode in accordance with the preferred embodiment of the present invention, are illustrated in FIGS. 6–8.

Figure 6:
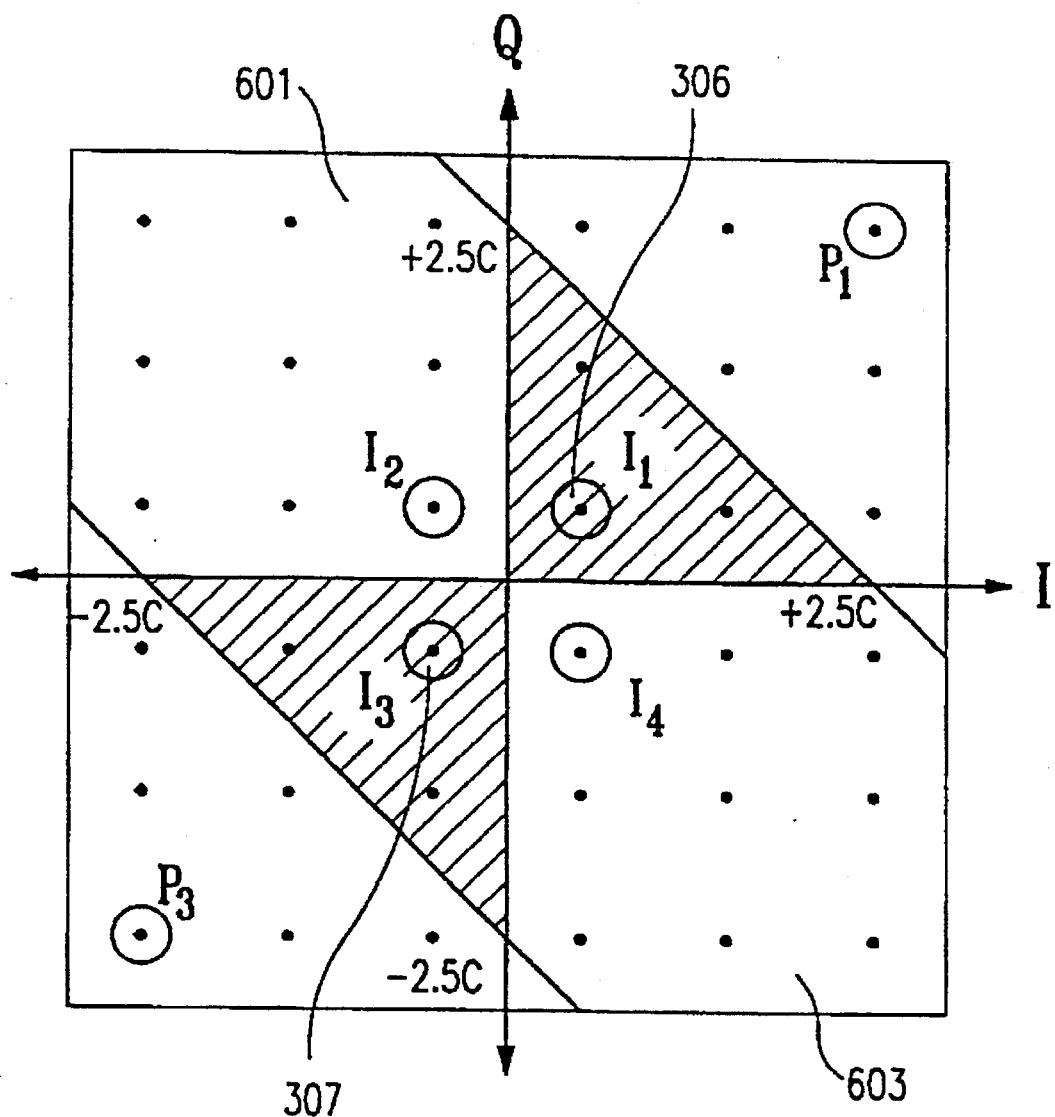
FIG. 6 illustrates a IDLE SLICER MODE in accordance with one embodiment of the present invention.

FIG. 6 illustrates the IDLE SLICER MODE. In the IDLE SLICER MODE, any combination of the two components having amplitudes which lie within an entire first quadrant 601 (i.e., the area that is both to the left of the quadrature axis "Q" and above the in-phase axis "I") will be accepted as a first idle symbol. Likewise, components having amplitudes which lie within an entire third quadrant 603 (i.e., the area that is both to the right of the quadrature axis "Q" and below the in-phase axis "I") will be accepted as a second idle symbol. Accordingly, the range of amplitudes for the first idle symbol includes all positive values of amplitude for the quadrature component to a maximum amplitude of 3C, where 3C is preferably the maximum amplitude without saturation of the receiver, and all negative values of amplitude for the in-phase component to a maximum amplitude of −3C. The ranges used to determine whether test symbols have been received are interactive. That is, the sum of the amplitude of the two components received must be less than +/−2.5C, with the amplitude of both components being of the same sign (e.g., in the first or third quadrant) in order to identify the received signal as a test symbol. The ranges used to determine whether the received signal is a preamble symbol are also interactive, with the sum of the in-phase and quadrature components being greater than +/−2.5C and each being less than 3C, and the amplitude of both components being of the same sign. Accordingly, any combination of in phase and quadrature amplitudes is within the range of +/−3C will be identified as one of three types of symbols; idle, test or preamble. While the ranges are relatively wide, the receiver nonetheless anticipates that the signals received were sent at the component amplitudes assigned to each symbol. Thus, the receiver can determine an error with respect to amplitude and phase to self correct the gain of the VGA 137 and the receiver clock phase and frequency for relatively large errors during IDLE STATE 501.

Figure 7:
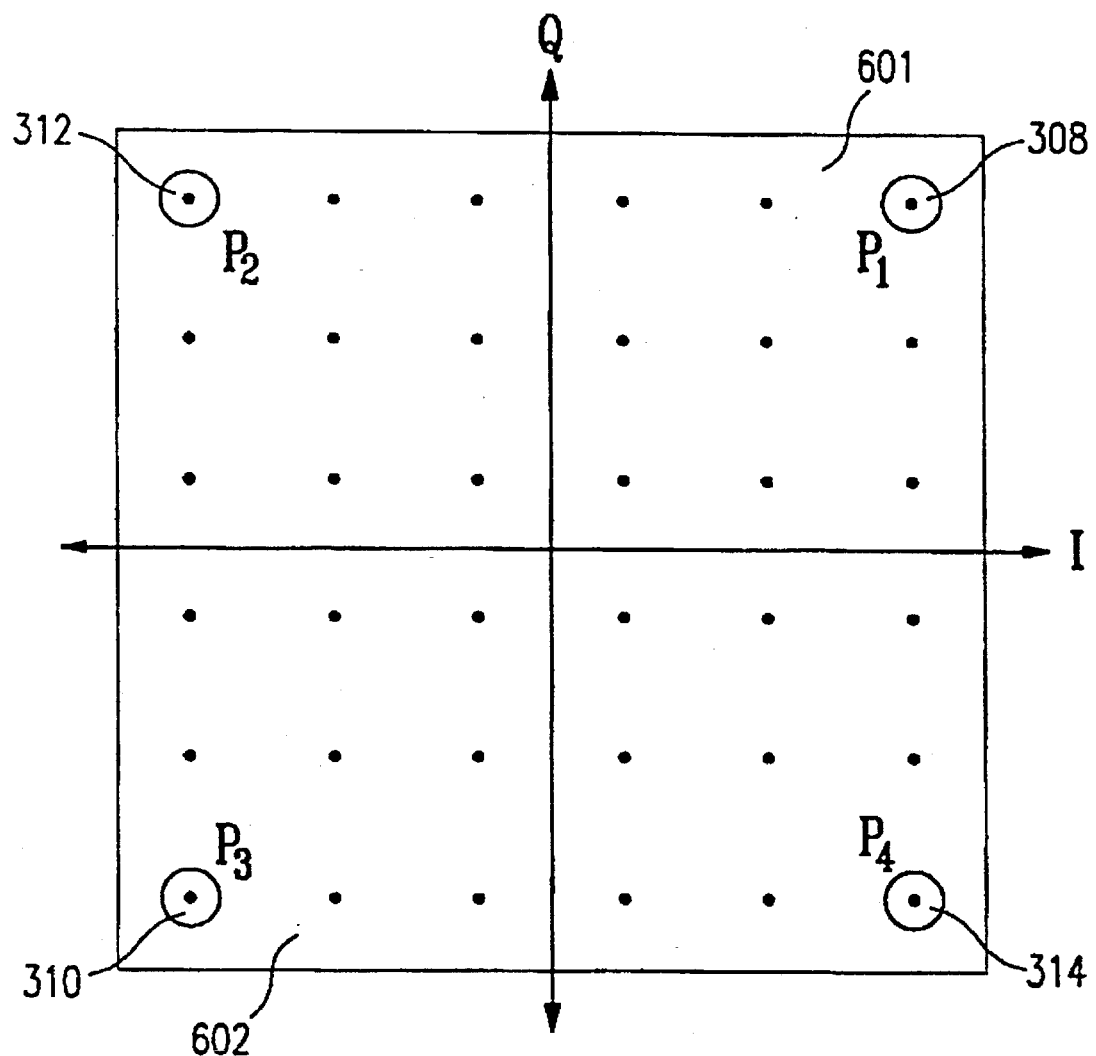
FIG. 7 illustrates the ranges of amplitude used to identify symbols in PREAMBLE SLICER MODE

FIG. 7 illustrates the ranges of amplitude used to identify symbols in PREAMBLE SLICER MODE. In PREAMBLE SLICER MODE, only four symbols can be identified. That is, symbols are identified as either one of two preamble symbols or one of two SFD symbols. Therefore, the particular quadrant 601, 603, 605, 607 of the CAP 36 constellation in which the input signal lies determines the identity of the symbol received. For example, if the in-phase component is positive and the quadrature component is positive, the symbol is assumed to be a preamble symbol represented by the point 308. If the in-phase component is negative and the quadrature component is positive, then the symbol is assumed to be an SFD symbol represented by the point 314. The particular amplitude is of no consequence, as long as the amplitude is within the range +/−3C.

Figure 8:
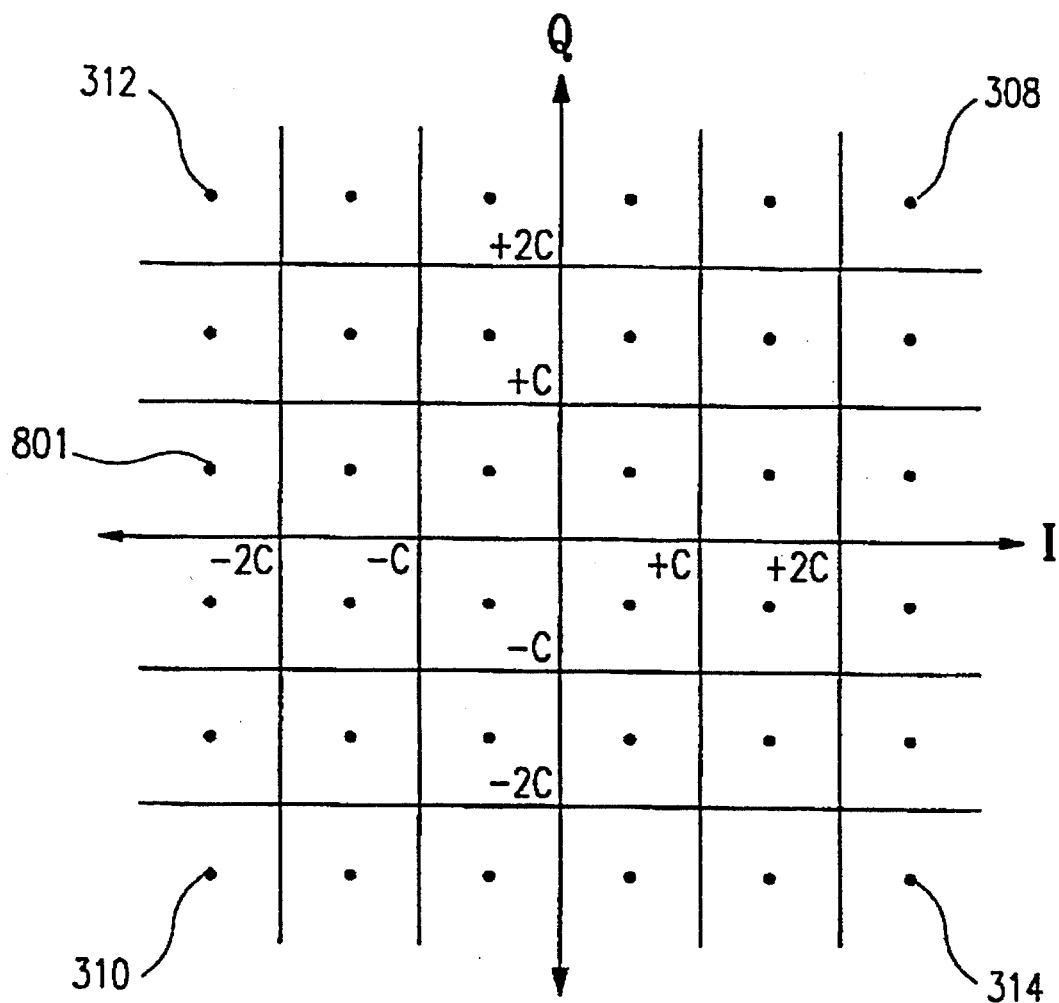
FIG. 8 illustrates the ranges of amplitude used to identify symbols in DATA SLICER MODE in accordance with one embodiment of the present invention.

FIG. 8 illustrates the ranges of amplitude used to identify symbols in DATA SLICER MODE. In DATA SLICER MODE, 32 symbols can be identified. Therefore, each symbol is associated with a range of +/C for both the in-phase and the quadrature components. For example, a signal received with a quadrature component having an amplitude within the range 0 to +C and an in-phase component within the range −2C to −3C will be interpreted as being point 801, which in the preferred embodiment of the present invention is the symbol used to represent the binary value "10100" (see Table 2).

TABLE 2

| I/Q | −3C− −2C | −2C− −C | −C−0 | 0−+C | +C−+2C | +2C− +3C |
|---|---|---|---|---|---|---|
| +2C−+3C | 10111 | 10011 | 10101 | 00101 | 00011 | 00111 |
| +C−+2C | 10110 | 10010 | 10001 | 00001 | 00010 | 00110 |
| 0−+C | 10100 | 10000 | 1000x | 0000x | 00000 | 00100 |
| −C−0 | 11100 | 11000 | 1100x | 0100x | 01000 | 01100 |
| −2C−−C | 11110 | 11010 | 11001 | 01001 | 01010 | 01110 |
| −3C−−2C | 11111 | 11011 | 11101 | 01101 | 01011 | 01111 |

In Table 2, the inner most four points 301,302, 306, 307 have an "x" in the fifth bit position. In one embodiment of the present invention, reception of a symbol which has components equal to one of these points 301,302, 306, 307 may be considered to have an ambiguity in the last bit. That is, it is assumed that the symbol that was received was in error by only one amplitude unit in only one component. In one embodiment of the present invention, if the absolute value of the amplitude of both the components is less than the C, then the component having the greatest absolute value is assumed to be in error, and as such is assumed to be between C and 2C for positive amplitudes or between −C and −2C for negative amplitudes. That is, the symbol is bumped to the nearest directly adjacent valid symbol. In an alternative embodiment, conventional error detection and correction techniques may be used to determine the state of the ambiguous bit.

In each slicer mode the value C is maintained in a "cursor" register within the receiver MII 129. The value C in the cursor register may be selected to scale the ranges used to determine which symbols have been received. In the preferred embodiment of the present invention, the cursor register holds a 7-bit unsigned value with a nominal value of $(2^8-1)/3$. The cursor register can be updated in one of two ways. First, the cursor register can be updated by writes from the receiver MII 129. Second, the cursor register can be updated by periodic updates based upon the performance of the receiver as determined by the decoder 157. For example, by determining the relative position of the idle symbols the value in the cursor register can be updated to properly locate the idle symbols. Accordingly, adjusting the value of the cursor register has an effect which is similar to adjusting the gain of the VGA 137.

In DATA SLICER MODE, the preferred embodiment of the present invention calculates an error value $\xi_x$ associated with each component of each symbol received. The error is the difference between the amplitude of each component of the symbol received and the amplitude expected of the symbol to which the received signal was mapped. In the preferred embodiment, the error is calculated as follows:

$$\xi_x = R_x - (S_x \cdot C)/2$$

where $R_x$ is the amplitude of the x component of the received signal; C is the cursor value; and $S_x$ is the value of the ideal normalized amplitude of the x component of the symbol to which the received symbol has been mapped. For example, if the in-phase component received $R_I$ is 0.4, the cursor register value is 1, and the in-phase component $S_x$ of the symbol to which the input signal was mapped by the encoder 111 is equal to 0.5, then the error is 0.05 for the in-phase component. In the preferred embodiment, the error for the in-phase component is added to the error for the quadrature component to yield a total error associated with the received symbol. Alternatively, the error may be calculated by determining the absolute distance between the two points using conventional means such as by applying the following formula:

$$\xi = [(R_1 - S_1 \cdot C)^2 + (R_Q - S_Q \cdot C)^2]^{1/2}$$

In addition, the detector 155 preferably tracks performance metrics, using two "noise level meters", one associated with each component of the received signal, and two "far-end signal level meters". Each noise level meter is a "leaky integrator" structure which accumulates the value of the slicer error $\xi_x$, using the following equation:

$$NM_{x,j} = (1-k)NM_{x,j-1} + k|\xi_x|$$

where $NM_{x,j}$ is the value of the meter for the x component of the $j^{th}$ symbol; and $\epsilon_x$ is the slicer error for component x as defined above. In the preferred embodiment, the coefficient k is a constant preferably equal to approximately ⅟64. The noise meter values $NM_I$ and $NM_Q$ are summed to provide the total noise meter value for each input symbol.

In the preferred embodiment of the present invention, a noise threshold register within the detector 155 stores a threshold value that is continuously compared with the noise meter value NM being calculated. This comparison is used by the start-up state machine 163 to provide feedback to assist in locking onto the optimal phase for the receiver clock during initialization, and if the threshold is violated to indicate whether action is required.

The far-end signal level meter monitors the estimated level of the far-end signal without reference to the cursor value C at the receiver. A leaky integrator is associated with each component of the received signal. The far-end signal level meter operates in accordance with the following formula:

$$SM_{x,j} = (1-j)SM_{x,j-1} + k|R_{x,j}|$$

where $SM_{x,j}$ is the far-end signal level of the x component of the $j^{th}$ symbol; $R_x$ is the value of the x component of the $j^{th}$ symbol; and k is a constant. The far-end signal level of both the in-phase and the quadrature component are summed to comprise the total far-end signal level SM. A signal level threshold register maintains a threshold value for the far end signal level. This threshold level is used when the AGC controller circuit 141 is actively adjusting the gain of the VGA 137 and to determine the appropriate cursor value C.

The carrier detect circuit 149 directly signals the receiver state machine upon receipt of a preamble symbol, preferably by asserting the CRS 173. In accordance with the preferred embodiment of the present invention, the input to the squelch/carrier detect circuit 149 is provided with little equalization and filtering. This is possible because the preamble is a single tone. Furthermore, the tone is not near the edge of the pass band of the input data. Still further, the amplitude of the preamble is relatively high. Accordingly, preamble detection is very fast since the delays of the filter and equalizer are substantially less.

The decoder 157 interprets the relative amplitudes associated with each component output from the detector and outputs a stream of digital bits to the FIFO 159. In order to minimize power consumption and provide a more predictable behavior on the MII receive bus RXD, predetermined bit patterns are injected into the system interface by the decoder 157 during non-data modes of operation of the decoder 157. For example, in one embodiment of the present invention, when the decoder is in IDLE MODE, the output of the decoder 157 is all digital 0's. In the preferred embodiment of the present invention, the output of the decoder 157 is in two's compliment data format.

The descrambler 161 outputs data at a data rate of 100 megabits per second. During the IDLE MODE of the decoder 157, the descrambler 161 is disabled by the receiver state machine 162. The decoder 157 operates in IDLE MODE when the receiver is in IDLE STATE 501, TEST STATE 502, or XON STATE 505. When the decoder 157 is operating in PREAMBLE MODE, the decoder 157 preferably outputs a correct preamble sequence, such as an sequence of alternating "1"s and "0"s as specified by IEEE 802.3 specification which comprises the first digital preamble symbol. That is, the sequence preferably always begins with "10101" in two's compliment format, regardless of which point on the CAP 36 constellation received as the first preamble symbol. The first digital preamble symbol "10101" output by the decoder 157 defines the start of the octet boundary synchronization. That is, upon receipt of the first digital preamble symbol, the data bits output by the decoder 157 begin to be grouped in 8-bit octets. FIG. 9a–9d illustrate the relationship between the output of the detector 155, the decoder 157, and the bit stream at the receiver MII output RXD.

Figure 9A:
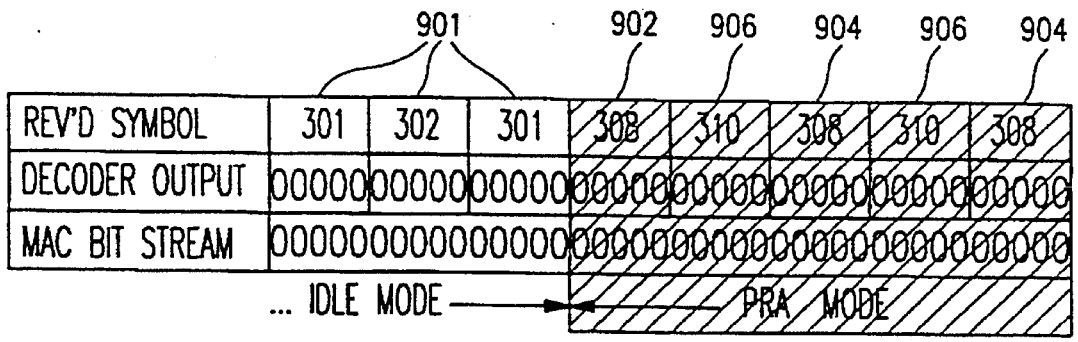
FIGS. 9a–9d illustrate the relationship between the output of the detector, the decoder, and the bit stream at the receiver MII output RXD in accordance with one embodiment of the present invention.

In FIG. 9a, amplitude values indicating that preamble symbols represented by CAP 36 constellation points 301 and 302 (see FIG. 3) are received by the decoder 157 as the first three symbols 901. Accordingly, the decoder 157 outputs a series of "0"s. In response to the received "0"s, the receiver MII 129 outputs "0"s on the RXD output line 130. Upon receipt of the first preamble symbol 902 represented by the CAP 36 constellation point 308, the decoder 157 outputs a preamble pattern "10101". Likewise, the receiver MII 129 outputs a bit pattern "10101" on the RXD output line 130. Each subsequently received symbol 904 represented by the CAP 36 constellation point 308 causes an output pattern of "10101" to be output by the decoder 157. Received signals 906 represented by CAP 36 constellation points 310 received by the decoder 157 cause patterns "01010" to be output by the decoder 157. This data pattern is repeated by the receiver MII 129 on the RXD output line 130.

Figure 9B:
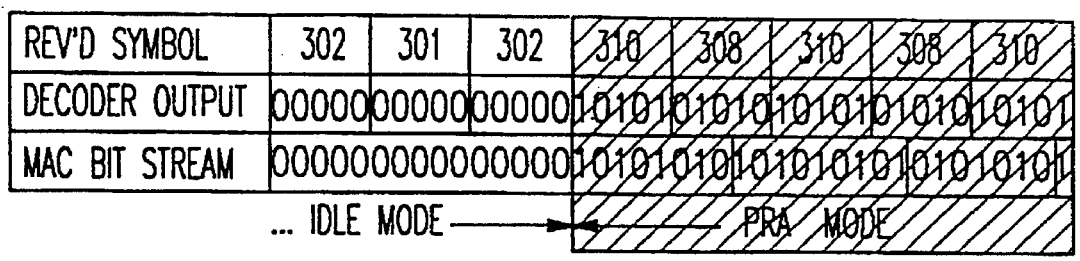

In FIG. 9b, the output from the decoder 157 and the receiver MII 129 are shown for a pattern of symbols in which the CAP 36 constellation point 310 is the first received preamble symbol. In accordance with the preferred embodiment of the present invention, the digital preamble symbol output by the decoder 157 starts with the pattern "10101" for the first preamble symbol, "10101" even though the first CAP point received was the point 310 rather than the point 308 as in FIG. 9a.

Figure 9C:
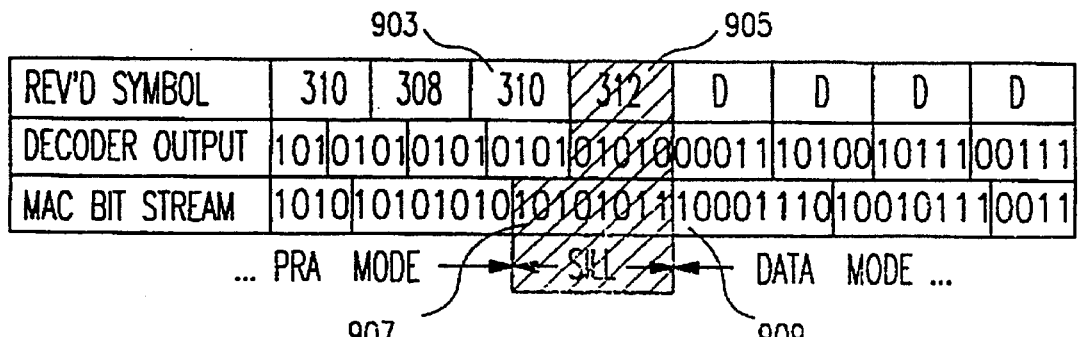

In FIG. 9c, the last preamble symbol 903 represented by CAP 36 point 310 is followed by an SFD symbol 905 represented by CAP 36 point 312. The data pattern that is output by the decoder 157 in response to the SFD symbol 905 is "01011". The "11" bit pattern at the end of the digital SFD symbol output from the decoder 157 identifies that digital symbol as the SFD. The receiver MII 129 outputs an SFD symbol 907 that is eight bits long and includes the "01011" pattern as the last four of those eight bits. In the instance shown in FIG. 9c, the SFD symbol 905 received at the decoder 157 is properly aligned with the last five bits of the 8-bit octet output by the receiver MII 129, such that the last four bits of the 8-bit symbol are "01011". In accordance with the present invention, the SFD indicates whether the first data bit output by the receiver MII 129 is to be a "0" or a "1". In accordance with one embodiment of the present invention, since the SFD was encoded using the CAP 36 point 312, the first data bit 909 output by the receiver MII 129 is a "1". The decoder 157 enters data mode after receipt of the SFD symbol. In data mode, the remainder of the data that is output by the receiver MII 129 tracks (with a one bit lag in the case illustrated in FIG. 9c) the data that is output from the decoder 157 as each symbol received by the decoder 157 and decoded into digital bits of data.

Figure 9D:
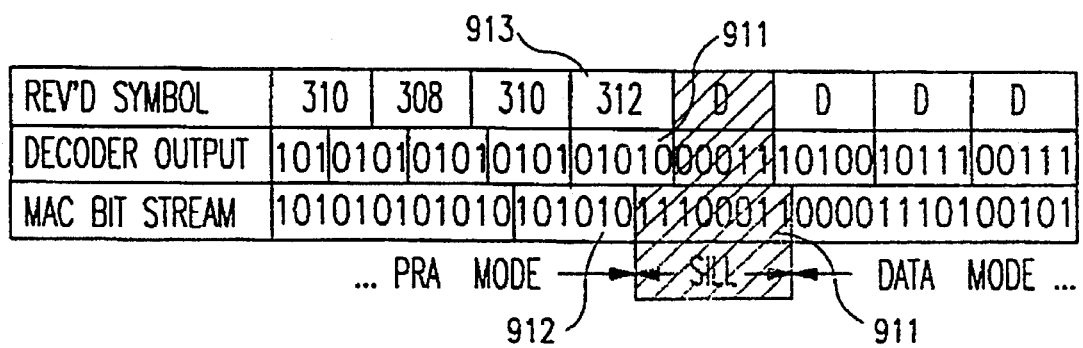

In accordance with the preferred embodiment of the present invention, in instances in which the SFD received by the decoder 157 is not aligned with the last five bits of the octet that is output by the receiver MII 129, buffer bits are inserted in the RXD 130 output by the receiver MII 129, as shown in FIG. 9d. In FIG. 9d, the five digital bits 911 that correspond with the SFD symbol 913 are not aligned with the last five bits of the last 8-bit digital preamble octet output by the receiver MII 129. Therefore, the output of the receiver MII 129 is padded with the addition of an alternating pattern 912 of "1"s and "0"s which allow the five bits of the SFD output by the decoder 157 to align with the last five bits of the octet output by the receiver MII 129. This is referred to as "bit-stuffing". For example, in FIG. 9d a "010101" pattern is inserted (or bit-stuffed) into the data stream output by the receiver MII 129, after which the pattern "01011" 911 associated with the SFD symbol 913 is output by the receiver MII 129.

Because the data output by the decoder 157 is not processed immediately when bit-stuffing is required, the FIFO 159 is used to buffer the data. Prior to the receiver entering the DATA STATE 509, the FIFO 159 remains idle and empty. That is, the output of the decoder 157 falls straight through the FIFO 159. When the receiver enters DATA STATE 509 (i.e., upon detection of an SFD symbol by the detector 155), the digital SFD symbol output from the decoder 157 is loaded into the FIFO 159 and remains in the FIFO 159 until the receiver MII 129 detects that the first three bits of a preamble octet have been output on the RXD 130. At that time, the contents of the FIFO 159 begin to flow into the receiver MII 129 at the rate of the receiver MII output. In order to manage the maximum number of bits that can be stored in the FIFO 159 before the first three bits of a new octet occur, the FIFO 159 is preferably 12 bits deep (i.e., the five bits of the five-bit digital SFD, plus up to seven bits of data).

Furthermore, the receiver MII 129 processes data at the rate of one 4-bit nibble every 40 ns, and the decoder 157 outputs data at a rate of one 5-bit digital symbol every 50 ns. Therefore, the rate at which data is output by the decoder 157 and the rate at which data is processed by the receiver MII 129 is approximately equal. However, the clock used to process data in the receiver MII 129 is not derived from the same source as the clock used to output digital symbols from the decoder 157. Accordingly, the present invention must account for the frequency tolerance and jitter of the receiver MII clock with respect to the decoder clock. In the preferred embodiment of the present invention, the FIFO 159 absorbs any difference or jitter between the receiver MII clock and the decoder clock.

In FIG. 9d, the SFD symbol 913 is the CAP 36 point 314. Therefore, the first bit of data output by the receiver MII 129 following the 8-bit SFD octet is a "0". Had the SFD symbol been the CAP 36 point 312 (as in FIG. 9c) the first data bit would have been a "1" as in FIG. 9c.

It can be seen from these examples that the alignment of the 5-bit codes output by the decoder 157 typically do not align with the 8-bit octets output by the receiver MII 129 during DATA STATE 509. These examples do not address the fact that the descrambler may alter the pattern output by the decoder 157.

In the preferred embodiment of the present invention, the detector is capable of detecting and correcting either a phase reversal, such as would occur if the signal and return lines are reversed when connected, and for reversal of the in-phase and quadrature components of the CAP 36 constellation.

The descrambler 161 is a conventional descrambler used in telephony, such as defined in standards such as International Telegraph and Telephone Consultative Committee (CCITT) V.34, to ensure that a sufficient number of bit inversions occur in the data. In the preferred embodiment, scrambler 161 is disabled during IDLE STATE 501, TEST STATE 502, PREAMBLE STATE 503, AND XON STATE 505. Thus, the descrambler 161 is effectively bypassed during these receiver states. In DATA STATE 509, JAM STATE 511, and COLLISION STATE 507, the descrambler 161 is synchronized to begin descrambling the data stream output from the FIFO 159 at the first bit of data (e.g., the bit represented by SFD) and is disabled after the last bit of the last data symbol is descrambled. Preferably, the scrambler 107 in the transmit section of the transceiver 101, and the descrambler 161 in the receiver section of the same transceiver 101 are distinct and thus can function concurrently to facilitate loopback modes of operation.

System Clocks

Figure 10:
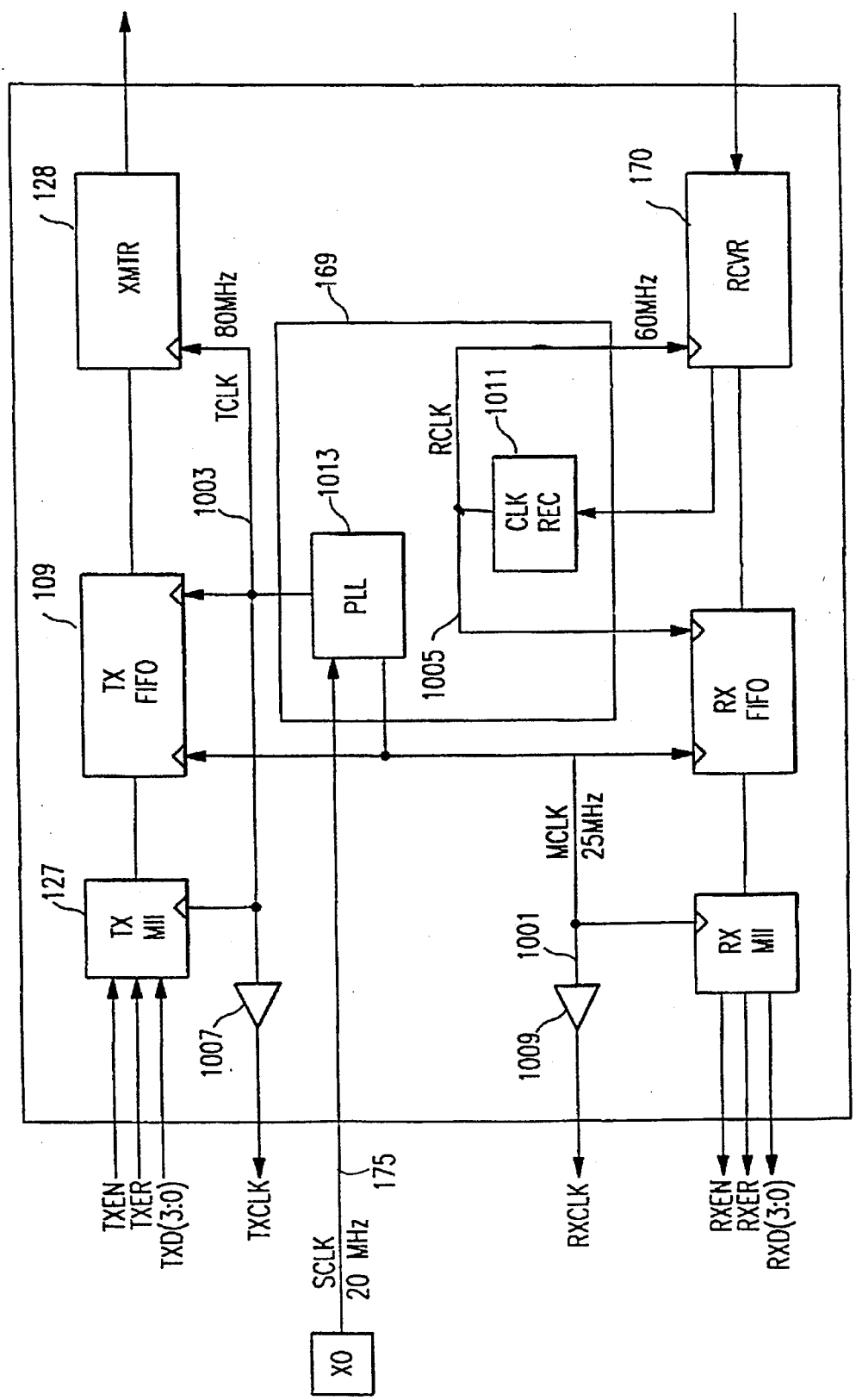
FIG. 10 is a block diagram of the relationship between the clocks in the transceiver and the components which utilize those clocks.

FIG. 10 is a block diagram of the relationship between the clocks in the transceiver and the components which utilize those clocks. It should be understood that the receive clock of a first transceiver receiving data from a second transceiver is independent of the transmit clock of the second transceiver. Therefore, as discussed below, the receive clock must maintain synchronization with the receive data by a clock recovery process. A clock (SCLK) 175 received in the transceiver 101 by the clock generator 169 from a crystal in the MAC 103 preferably runs at approximately 20 MHz. The clock generator uses the SCLK 175 to generate two internal clocks, MCLK 1001 and TCLK 1003. MCLK 1001 is used to synchronize the interface to the MAC 103, and TCLK 1003 is used to drive the digital portion (including the DAC 123) of the transmitter. Another clock, RCLK 1005, is used to clock the receiver. Within the clock generator 169 is a phase-lock-loop (PLL) circuit 1013 that is preferably used to generate the MCLK 1001 at a frequency of 80 MHz and to generate the TCLK 1003 at a frequency of 25 MHz in conventional fashion.

Figure 11:
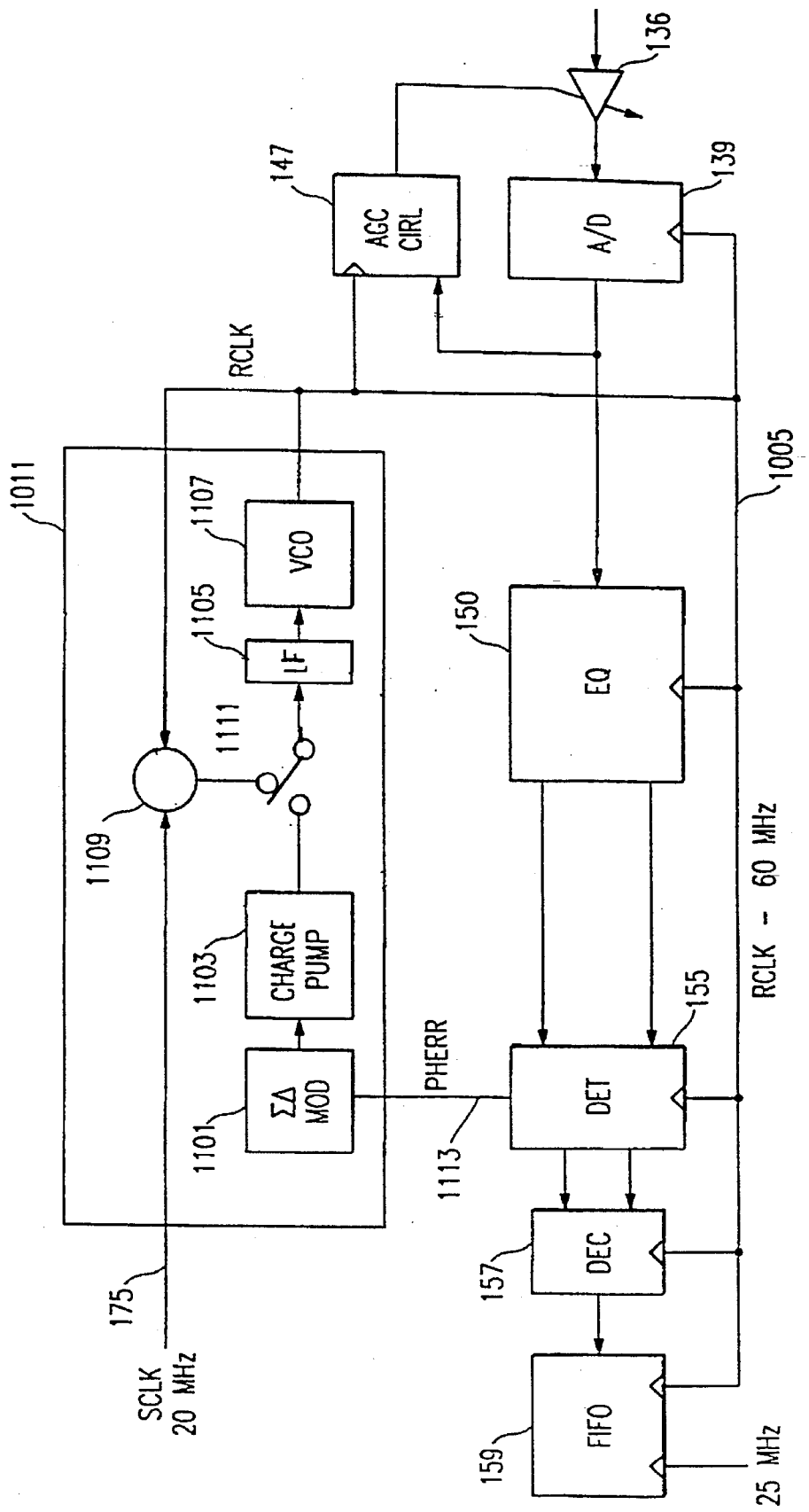
FIG. 11 is a block diagram of the clock recovery circuit in accordance with the present invention.

The RCLK 1005 is generated by a clock recovery circuit 1011 within the clock generator 161. FIG. 11 is a block diagram of the clock recovery circuit 1011 and the devices within the receiver that are coupled to the clock recovery circuit 1011. The clock recovery circuit 1011 comprises a sum/difference modulator 1101, a charge pump 1103, a low pass filter 1105, a frequency controllable oscillator, such as a voltage controlled oscillator (VCO) 1107, a phase detector 1109 and a mode switch 1111. The clock recovery circuit operates in two modes; track mode and capture mode. In capture mode, the phase detector 1109 is coupled to the low pass filter 1105 and receives an error signal representing the phase difference between the phase of the SCLK 175 and the phase of the signal output by the VCO 1107 to phase lock the output of the VCO 1107 to the reference SCLK 175, in conventional fashion. Accordingly, when the system first begins to operate, or if the error that is detected at the detector 155 exceeds a tolerance level, the VCO 1107 can be brought back to a known condition. Under normal conditions, the VCO 1107 tracks an error signal PHERR 1113 which is derived from the error signal $\xi_x$ generated by the detector 155, as detailed above. The PHERR signal is derived in accordance with the following formula:

$$PHERR = (R_I \cdot \epsilon_Q) - (R_Q \cdot \xi_I)$$

or alternatively, $$PHERR = (R_I \cdot S_Q) - (R_Q \cdot S_I)$$

where $\xi_x$ is the error value associated with each component of each symbol received; $R_x$ is the amplitude of the received symbol; and $S_x$ is the value of the ideal normalized symbol to which the received symbol has been mapped. The error signal PHERR is preferably a six bit digital value that quantifies the magnitude and direction of any rotation (i.e., phase difference) of the CAP constellation points received, with respect to the CAP constellation derived with respect to the RCLK 1005. The phase error is compared with a zero reference, and the charge pump 1103 either sources or sinks current depending upon whether the phase error is positive or negative. The loop gain and filter characteristics are generally not the same for the capture and tracking modes. During tracking, a relatively high gain is preferably used during PREAMBLE STATE 503 AND IDLE STATE 501, and a relatively low gain is preferably used during TEST STATE 502, DATA STATE 509, and JAM STATE 511.

Startup State Machine

In accordance with the present invention, the transceiver has a startup state machine 163. The startup state machine 163 controls the operation of the transceiver after power is first applied. The startup state machine first ensures that an IDLE pattern is being received at the receiver to ensure that another station is connected to the receive data lines. Preferably training of either the local receiver or the remote receiver must be done with only the transmitter coupled to that receiver transmitting. Therefore, once an IDLE pattern is received, the startup state machine 163 determines whether receiver is to be trained first. This is determined by an arbitrary selection of one of two states (on and off) with respect to the local transmitter. That is, if a first state is arbitrarily selected, then the local transmitter continues to transmit an IDLE pattern, anticipating that the remote transmitter will be turned off and the remote receiver will begin a training routine. Conversely, if a second state is arbitrarily selected, then the local transmitter ceases transmitting.

Assuming that the first state is selected, the assumption that the remote transmitter is off is verified by detecting that the remote transmitter has ceased transmitting. If the remote transmitter has also arbitrarily selected the "on" state, then the local receiver senses that the remote transmitter continues to send an IDLE pattern. The remote receiver will also sense that the local transmitter is still on. Each startup state machine 163 will then make a new arbitrary selection between "on" and "off" states. This process continues until only one of the transmitters is operating.

If the remote transmitter is transmitting, then the local transceiver begins performing a training procedure. In accordance with the preferred embodiment of the present invention, during the training procedure the ACG controller 141 is activated to converge on the appropriate gain for the IDLE pattern received. Once the proper gain is determined, then the control voltage from the AGC controller 141 to the VGA 137 is preferably used to make an estimate of the length of the receiver line. By making such an estimate, the local startup state machine 163 can predict the proper coefficients to supply to the FIR filters by either applying theory or using experimental data. In accordance with the present invention, such estimates are made to an accuracy of 30 meters. That is, the voltage on the VGA control line is divided by at least one threshold into at least two voltage ranges. Each of the ranges include the control voltages which will likely be present on the VGA control lines when the transmission line between the receiver and the transmitter is within a 30 meter range. For example, if the full control voltage range is 5 volts, a plurality of thresholds may be set. The range of transmission line lengths indicated by voltages that are less than the first threshold are assumed to be in the range of 0–30 meters (assuming that the gain of the VGA 137 increases with greater control voltage). The second threshold is set such that control voltages between the first and second threshold are assumed to be in the range of 30–60 meters. Each of the other thresholds which determine a range of control voltages is set such that the assumption that the transmission line length is in a range of 30x to 30(x+1), where x is an integer value.

Preferably, two thresholds are set which define three transmission line ranges; 0–30 meters, 30–60 meters, and greater than 60 meters.

Also, the clock recovery circuit 140 causes the receive clock to converge, as described above. After a predetermined period of time, the remote transmitter will transition to TEST STATE 203 under control of the remote startup state machine 163. Upon detecting the test pattern, the local receiver adapts the equalizer circuit 150, in known fashion. Once the equalizer circuit 150 has been properly adapted, the local transmitter begins transmitting an idle pattern. The local NEXT canceler is then adapted. Receipt of the idle pattern at the remote transceiver causes the remote startup state machine 163 to begin the training procedure to allow the local transmitter to train the remote receiver after a period which is sufficiently long to allow the NEXT canceler to be adapted.

If the local transmitter is transmitting, then the remote transceiver begins performing the training procedure first. Accordingly, the local startup state machine 163 sends an idle pattern for a predetermined amount of time which is sufficiently long to ensure that a properly operating remote transceiver will have time to converge the gain of the VGA 137 and clock recovery circuit 140. Next, the local transmitter sends a test pattern (preferably the test pattern described above) for a sufficiently long period to allow the remote equalizer circuit 150 to converge. If the local receiver has not already been trained, then the startup state machine 163 awaits an indication that the receiver is receiving an idle pattern and turns the local transmitter off to allow the local receiver to be trained.

By training each receiver without any local transmission from the local transmitter, the AGC control circuit 141, clock recovery circuit, and the equalizers are provided the best possible conditions in which to be adapted. Once the training periods for both the local and remote transceivers are completed, each transmitter enters IDLE STATE 201.

Repeaters and Repeater Bus

Figure 12:
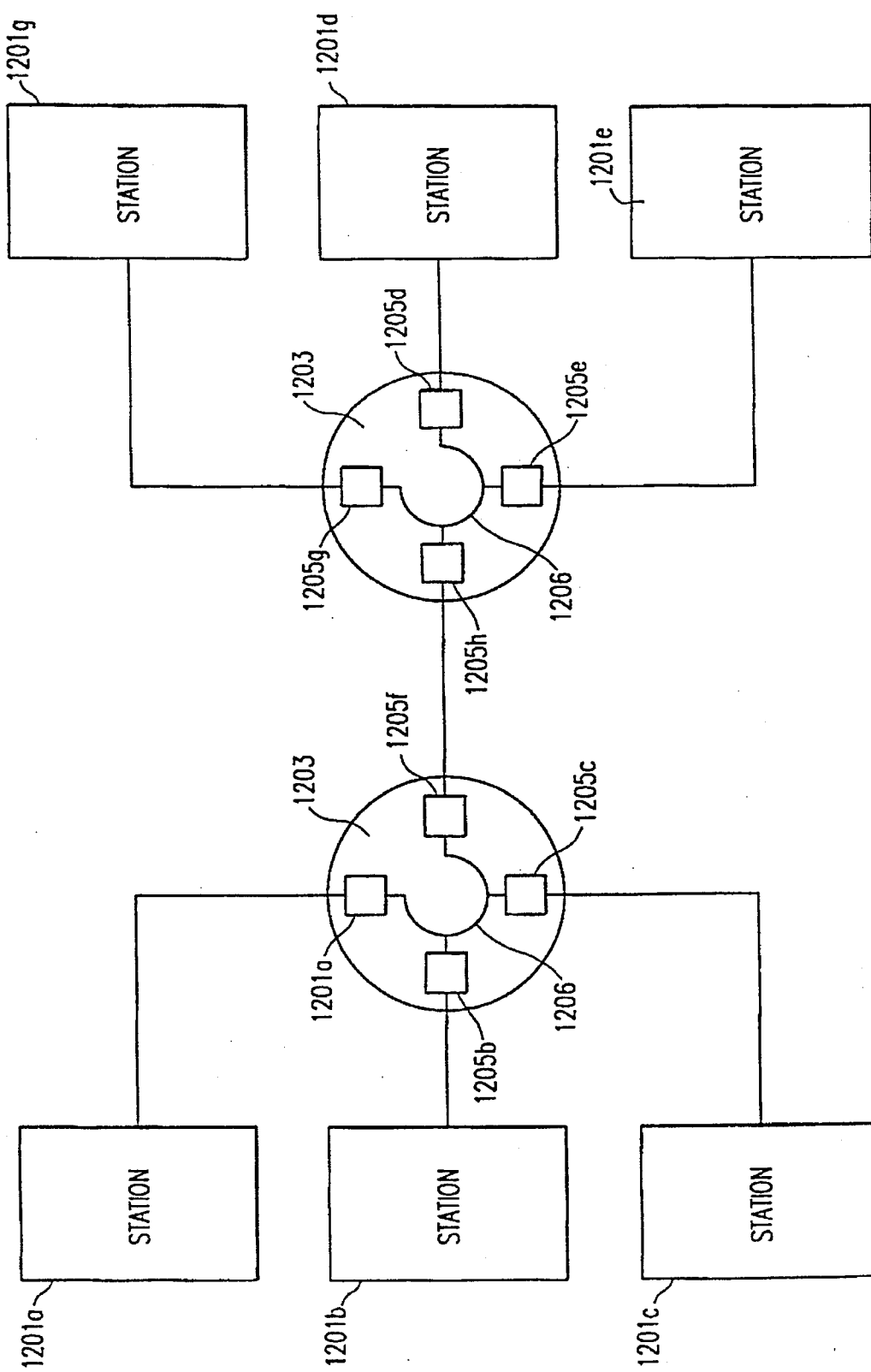
FIG. 12 is an illustration of a network in accordance with one embodiment of the present invention which has a plurality of stations and uses repeaters to allow each station to communicate with each other station.

In accordance with the present invention, each station is coupled to only one other device. Therefore, in order to allow more than two stations to communication with one another repeaters are required. FIG. 12 is an illustration of a network in accordance with one embodiment of the present invention which has a plurality of stations 1201 and uses repeaters 1203 to allow each station 1201 to communicate with each other station 1201. In one embodiment of the present invention a plurality of transceivers 101 essentially identical to the transceivers described above are provided within the repeater 1203. Each of the plurality of transceivers 101 is associated with a unique corresponding port of the repeater 1203.

Referring back to FIG. 1a and 1b, the repeater interface 168 interfaces a transceiver 101 within a repeater with each other transceiver 101 within that repeater via a repeater bus 1206. For example, a transceiver 101a sends data that is received by the repeater 1203 in the first transceiver 101a from a first station 1201a to a second transceiver 101b which repeats the data to a second station 1201b. Data is transmitted over the repeater bus on six data lines. In accordance with the preferred embodiment of the present invention, a digital representation of one CAP 36 point is transmitted in parallel over the data lines. The data lines comprise three bi-directional lines dedicated to transmitting a digital representation of the in-phase amplitude of a symbol as a signed binary number, and three bi-directional lines dedicated to transmitting a digital representation of the quadrature amplitude of the symbol as a signed binary number. That is, since the amplitude of the in-phase component and the quadrature component may each have an amplitude that is +/−1, +/−3, or +/−5 (with respect to a standard unit measure of received amplitude), three bits will determine which of these amplitudes are associated with the symbol. Alternatively, eight lines (four lines per component) may be used to transmit the in-phase and quadrature amplitudes in two's compliment.

In addition to the six data lines there is a clock line on the repeater bus 1206 which transmits a clock to each transceiver 101. In the preferred embodiment of the present invention, the repeater bus clock is a 20 MHz clock derived by a clock generator within the repeater 1203. However, in an alternative embodiment of the present invention, the repeater bus clock may be derived from a transmit clock received by the repeater from an MII. In any case, the clock is preferably common to all transceivers 101 within the repeater 1202.

Also, there are preferably six control lines within the repeater bus 1206; (1) four transceiver address lines, which indicate which (if any) transceiver is active on the repeater bus 1206; (2) one carrier sense, which indicates when at least one transceivers 101 has received a data frame (i.e., preamble) from a station 1201 coupled to the repeater 1203; and (3) one collision detect, which indicates that more than one transceiver 101 has received a data frame. In the preferred embodiment of the present invention, each of the control lines is an open-collector, active low type. That is, any one or more of the transceivers 101 may assert a control line by pulling the control line low.

It will be clear to those of ordinary skill in the art that the number of data and control lines used may vary. For example, data may be transmitted serially, or in other formats which require a different number of data lines.

To understand the operation of the repeater bus, the following example of the repeater bus operation is provided. Assume that the transceiver 101a receives a preamble from the station 1201a. The repeater interface 168 within the transceiver 101a asserts the carrier sense control line to indicate that a preamble has been received within the repeater 1203 by one of the transceivers 101. The repeater interface 168 also asserts a unique repeater bus address which is associated with that transceiver 101a on the four repeater bus address lines. It should be understood that the number of transceivers 101 is limited by the number of unique addresses available and the ability of each transceiver to drive the repeater bus lines. Since the preferred embodiment uses only four repeater bus address lines, up to sixteen transceivers 101 may be present. The repeater interface 168 then checks the state of the repeater bus address lines. If the repeater bus address lines do not reflect the address of the transceiver, then it is assumed that another transceiver 101 also received a data frame and has asserted repeater bus address lines and the carrier sense line. The repeater interface 168 asserts the collision line in response to the perceived contention. Upon sensing that the collision line has been asserted, each transceiver 101 within the repeater 1203, including the transceiver 101 a which asserts the collision line, transmits JAM symbols to the station 1201 associated with that transceiver 101. A number of alternatives for dealing with such a contention at each station are possible.

Alternatively, if the address asserted on the address lines is checked by the repeater interface 168 and is found to be identical to that transceiver's address (i.e., the same address that was asserted by that transceiver), then the repeater interface 168 begins transmitting each symbol received (i.e., digital data representing the amplitude of each symbol output from the detector 155 of the transceiver 101a) over the repeater bus interface data lines. As each other transceiver 101b, 101c, 101d, 101f receives the data, each repeater interface 168 within each transceiver 101b, 101c, 101d, 101f couples the data into the transmit FIR filters 117, 119 through the multiplexers 113, 115 for transmission to the associated station 1201. As can be seen from FIG. 12, one (or more) of the ports of a repeater 1203 may be coupled to another repeater 1203.

In some systems, it may be that a plurality of receive and transmit lines are bundled together within a single multiconductor cable. This increases the amount of cross talk between transmit and receive lines. Normally, it is recommended that no more than one set of lines including one transmit and one receive pair be included in the same cable. However, the embodiment of the present invention shown in FIG. 1b illustrates one method in accordance with the present invention for reducing the detrimental effects of cross talk between transmit lines and receive lines coupled to one repeater 1203. The embodiment of the present invention illustrated in FIG. 1b shows a DFE 190 coupled the detector 155 and to the summing circuits 151, 153. The DFE 190 receives the information regarding the amplitude of each of the two components (in-phase and quadrature) from the detector 155. The DFE 190 then delays and weights these signals so as to cancel any cross talk which may be been imposed on the signal transmitted by the repeater 1203 by the signal being received within the transceiver 1201. Since the signal being transmitted by any transceiver 1201 within the repeater 1203 is a delayed representation of the same signal that is being received in accordance with the present invention, any cross talk generated by a transmit line bundled together with one or more receive lines is generated by the same signal being received by the repeater 1203, however delayed by the delays through each transceiver. Thus, by delaying and weighting the received signal and summing the weighted delayed representation of the received signal back into the summing circuits 151, 153, the cross talk is cancelled.

Data Channel With Out of Band Signalling

In accordance with another embodiment of the present invention, signaling of the line condition is implemented on a control channel over one twisted pair of conductors, while data is transmitted over a corresponding data channel on a second twisted pair of conductors. Both the data channel and the corresponding control channel carry signals in the same direction under normal conditions. The twisted pair of conductors that are used to transmit control symbols on the control channel from the first station to the second station is also used to transmit data symbols on the data channel from the second station to the first station. Likewise, the twisted pair that is used to transmit control symbols on the control channel from the second station to the first station is used to transmit data symbols on the data channel from the first station to the second station. Therefore, only one station can transmit data at a time.

FIG. 13 illustrates the direction of signals on both the control channel and the data channel when data is transmitted between a first and a second station in such an alternative embodiment of the present invention in which out-of-band signalling is provided. In accordance with the embodiment of the present invention illustrated in FIG. 13, neither channel 1301 carries a signal until a transmission of information is to occur. Thus, by monitoring the control channel 1301a, 1301b each station 1303, 1305 can determine that the corresponding data channel is idle. Alternatively, an IDLE pattern can be defined and transmitted on the control channel 1301 a to signify an IDLE state. As shown in FIG. 13a, when data is to be transmitted over a data channel from a first station 1303 to a second station 1305, a first twisted pair of conductors is used as the control channel. The control channel carries a clock pattern when data is being transmitted on the data channel. The clock pattern indicates that the transmitter in the transmitting station 1303 is in DATA state, and that the corresponding data channel is in use. The clock pattern is preferably identical to the IDLE pattern disclosed above. That is, the clock pattern preferably alternates between a first and a second point on a CAP 16 constellation, each such point preferably being one of the four inner most points on the constellation. Still further, the first and second constellation points of the clock pattern are preferably in opposite quadrants from each other. That is, if the first point is in the first quadrant of the constellation (i.e., both in-phase and quadrature components have positive amplitudes), then the second point is in the third quadrant of the constellation (both in-phase and quadrature components have negative amplitudes), and alternatively, if the first point is in the second quadrant of the constellation (i.e., the in-phase component has a positive amplitude and the quadrature component has a negative amplitude), then the second point is in the fourth quadrant of the constellation (i.e., the in-phase component has a negative amplitude, and the quadrature component has a positive amplitude).

By using a pattern of alternating inner points in opposite quadrants of the CAP constellation on the control channel, the receiver is provided with a signal indicative of the fact that the corresponding data channel is in use and that has relatively low energy, relatively low frequency, and can be relatively easily detected. Furthermore, the clock pattern allows the receiver within the station 1305 receiving the data to be synchronized in known fashion with the transmitter in the station 1303 sending data on another twisted pair 1301*b*. It should be understood that in accordance with one embodiment of the present invention, the clock pattern may be any pattern of data that allows the receiver to synchronize to the transmitter. In accordance with an alternative embodiment, the control channel transmitter may transmit a pattern to which the receiving station may not be able to synchronize, but which does indicate the presence of data on the data channel.

In accordance with the present invention, the second twisted pair 1301*b* is used as the data channel. Data is preferably encoded using CAP 16 encoding. In accordance with CAP 16 encoding, 16 different symbols are possible by combining an in-phase and quadrature component, each of which may have an amplitude that is within one of four ranges. Thus, each CAP symbol preferably represents four bits of digital data. Due to the use of CAP encoding, a relatively high data rate can be achieved using only one data channel over a twisted pair of conductors in accordance with the EIA/TIA 568 category 3 standard. In accordance with the present invention in which an out-of-band control channel is used, CAP 16 encoding is preferable to CAP 32 encoding, since the rate at which symbols can be transmitted is greater due to the fact that no overhead (i.e., control) symbols are transmitted over the data channel. Because CAP 16 has only four amplitude ranges, either the signal to noise ratio can be improved, or the maximum required amplitude within the constellation can be reduced, thus reducing the emission of electromagnetic fields, or some combination of these two.

Figure 13A:
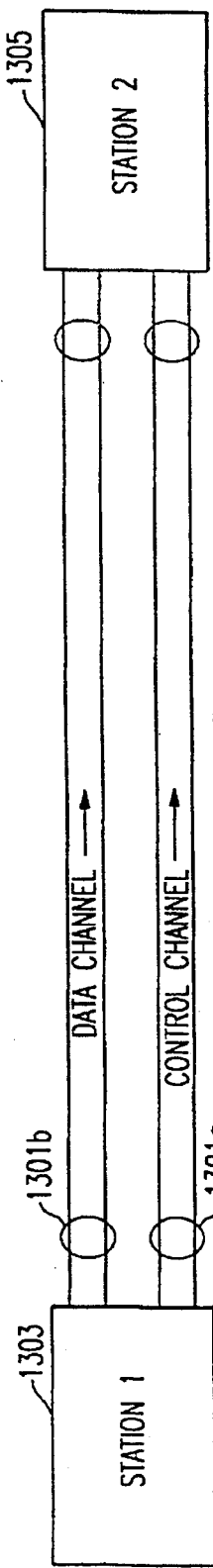
FIGS 13a, 13b, and 13c, 13d illustrates the direction of signals on a control channel and a data channel when data is transmitted between a first and a second station in alternative embodiment of the present invention in which out-of-band signalling is provided.
Figure 13B:
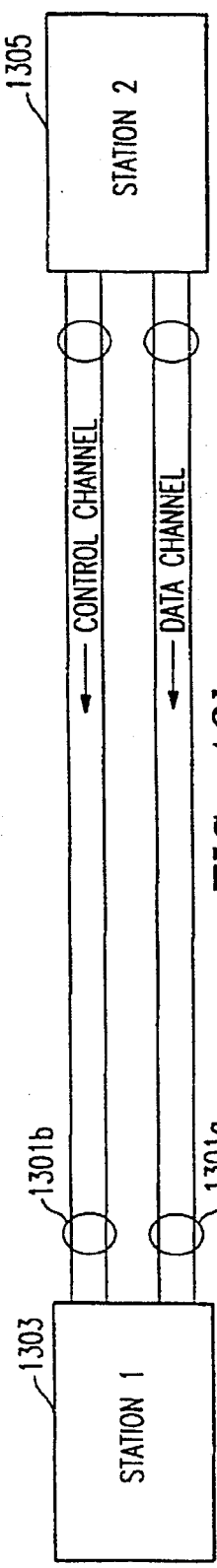

In accordance with the preferred embodiment, once the second station 1305 detects that the lines are clear (i.e., the control channel is clear, or alternatively, an IDLE pattern is present on the control channel), the second station 1305 can begin transmitting data on the data channel using one twisted pair 1301*a*, and the clock pattern on the control channel using the other twisted pair 1301*b*, as shown in FIG. 13*b*.

Figure 13C:
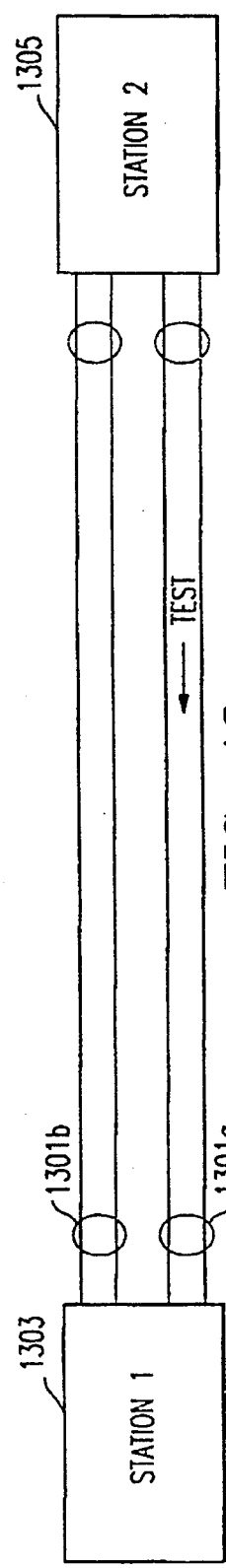

FIG. 13*c* is an illustration of a station 1305 training another station. The transmitter within each station 1303, 1305 can train the receiver within the other station 1305, 1303 by transmitting a test pattern over the control channel. Alternatively, a test pattern may be transmitted by both stations 1303, 1305 at the same time. In accordance with the present invention, the test pattern is the same as the test pattern used with the embodiment described above with respect to in-band signalling. That is, the test pattern in one embodiment of the present invention includes the inner most four points in the CAP 16 constellation, preferably transmitted in a pseudo-random sequence.

Figure 13D:
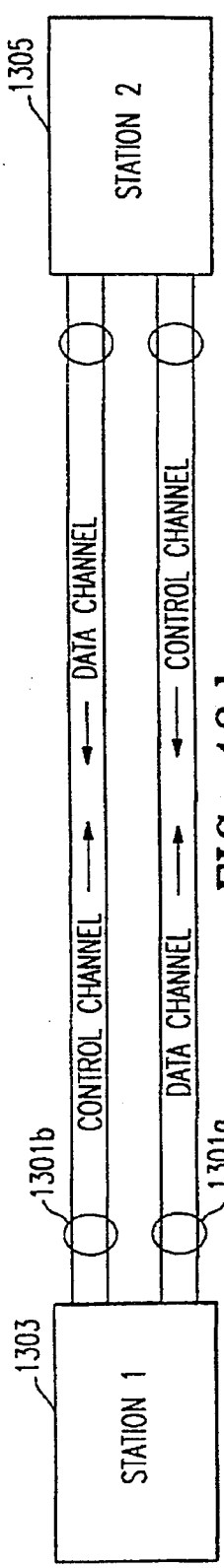

In the case in which both stations concurrently begin transmitting data and clock, a contention occurs, as illustrated in FIG. 13*d*. When a contention occurs, each transmitter detects the presence of a clock pattern on the data channel. That is, the first station 1303 transmits data over the data channel 1301*a* and a clock pattern over control channel 1305, while the second station transmits data over the data channel 1301*b* and a clock pattern over the control channel 1301*a*. It should be clear that during a contention condition, the twisted pair used for transmitting the data channel in one direction is also used to transmit the control channel in the other direction. Thus, by canceling the clock (or other control symbols being transmitted) using a cancellation circuit, such as an FIR filter and more particularly, such as the receiver filters 143, 145 described above in connection with FIG. 1*a*) to cancel the control signal that is being transmitted, and monitoring the output of the cancellation circuit, a determination can be made that a contention condition exists if data patterns are detected. Since the clock pattern is a relatively simple, repetitive pattern, it is easily canceled from the outgoing control channel in each station 1303, 1305. Thus, contention conditions may be easily and quickly detected. Upon detecting a contention, each station ceases transmitting data, and begins transmitting a JAM pattern over the corresponding control channel. The JAM pattern is preferably a pattern of CAP 16 signals which alternate between a first and second CAP point within the same quadrant of the CAP constellation.

Figure 14:
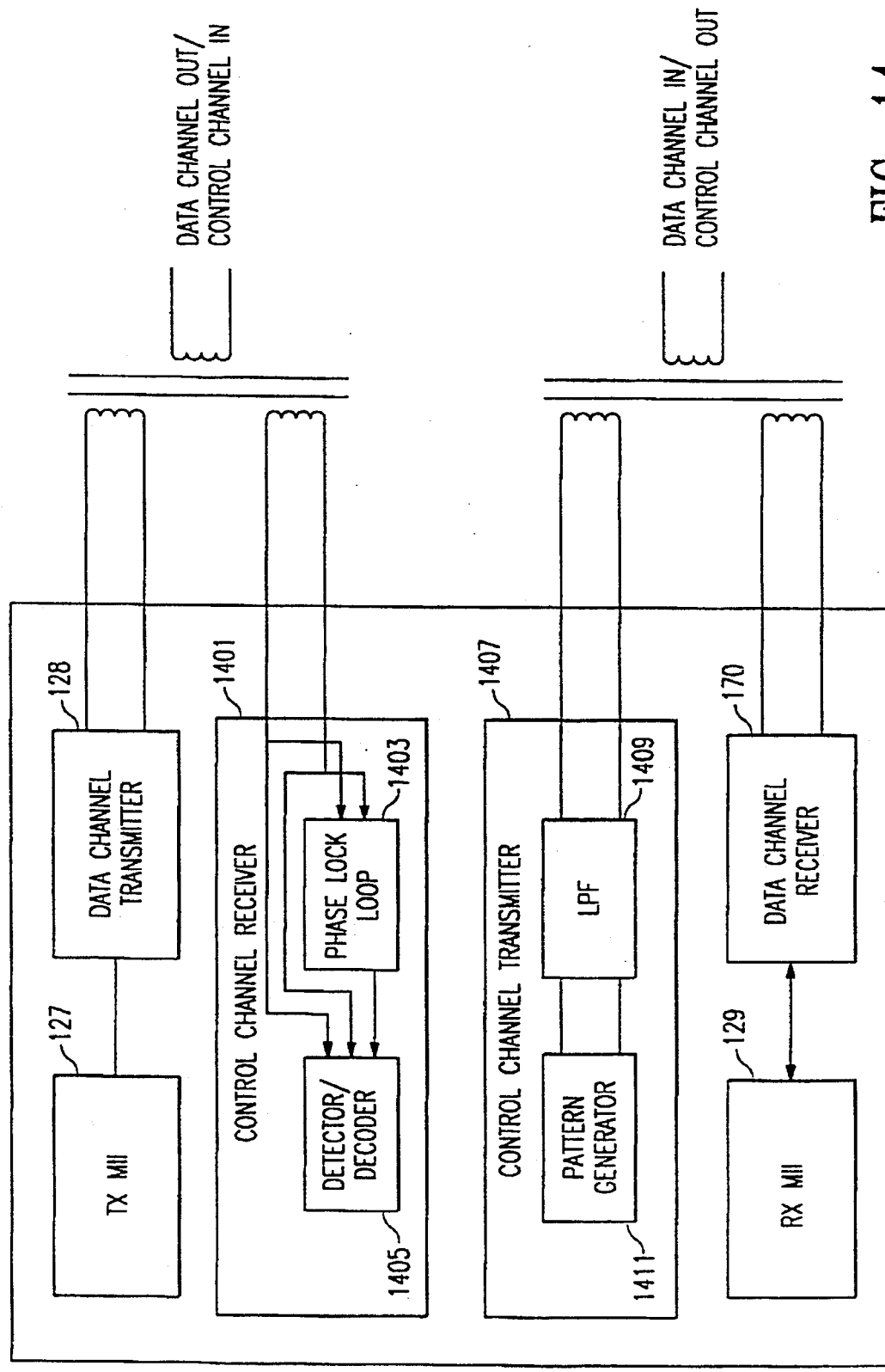
FIG. 14 is a block diagram of a station 1303 in accordance with one embodiment of the present invention in which control symbols are transmitted out of band.

FIG. 14 is a block diagram of a station 1303 in accordance with one embodiment of the present invention in which control symbols are transmitted out of band. The data transmit channel is essentially as depicted in FIG. 1*a*. A data channel transmitter 128 is coupled to a transmit MII 127 and causes data to be transmitted essentially under control of the transmit MII 127. The output of the data channel transmitter 128 is transformer coupled to the twisted pair of conductors 1301*b* on which the data channel is transmitted. Also transformer coupled to the twisted pair of conductors 1301*b* on which the data channel is transmitted is a control channel receiver 1401. A conventional phase lock loop circuit 1403 receives the signal from the twisted pair 1301*b*, and when a clock pattern is received from another station 1305, phase locks to the clock pattern. The phase lock loop output synchronizes a detector/decoder circuit which detects CAP symbols in a conventional manner to the clock pattern received on the control channel. In one embodiment of the present invention, the control channel receiver 1401 is coupled to and controlled by the receiver MII 129. The symbols received by the control channel receiver 1401 are provided to the receiver MII 129. Accordingly, the receiver MII 129 determines the state of the received data channel. Alternatively, the control channel receiver 1401 may be coupled to discrete processor which communicates with the receiver MII 129.

A control channel transmitter 1407 is transformer coupled to the twisted pair of conductors 1301*a*. The control channel transmitter 1407 comprises low pass filter, and a pattern generator 1411. In accordance with the preferred embodiment of the present invention, the pattern generator 1411 is coupled to, and receives commands from the transmit MII 127 which indicate which particular pattern is to be transmitted. The pattern generator 1411 preferably outputs one of the following patterns: (1) the clock pattern, (2) the test pattern, or (3) the jam pattern in response to the commands from the transmit MII 127. In an alternative embodiment of the present invention, a discrete processor may be coupled to the pattern generator to command the patterns to be transmitted. Also transformer coupled to the twisted pair of conductors 1301*a* is a data channel receiver 170, which is essentially identical to the receiver depicted in FIG. 1*a*. The data channel receiver 170 is coupled to a receiver MII 129.

Near End Cross-Talk

Since both the clock pattern and data patterns are transmitted from the same station, the amount of near end cross talk between the data channel and the corresponding control channel is typically minimal. However, in one embodiment of the present invention, a near end cross talk canceler is provided to cancel the cross talk generated between the data and clock patterns. Such a near end cross talk canceler receives the data patterns being transmitted from the transmitter over a connection between the transmitter circuit responsible for generating the clock pattern and the near end crosstalk canceler. The near end cross talk canceler comprises an FIR filter which cancels the data patterns from the outgoing clock pattern in known fashion.

Conclusion

From the above description of one embodiment of the present invention, it can be seen that there are a number of advantages provided by the present invention. For example, since the present invention preferably alternates between the CAP constellation points 301,302 shown in FIG. 3 at the symbol rate, the frequency and amplitude of the idle pattern transmitted by a station during IDLE STATE 201 is relatively low. Thus, the near end cross talk that results from the transmitted signal is reduced. Furthermore, since during IDLE STATE 201, each component of the transmitted signal is at only one of two relative amplitudes, the near end cross talk filters may be simplified. Furthermore, because preamble symbols are detected by the detector 155 directly from the amplitude of the in phase and quadrature components of the received signal without having to decode or descramble the preamble symbol, preamble symbols are detected rapidly, facilitating rapid collision detection, and aiding in properly synchronizing the descrambler and decoder. In addition, the transmission of a pattern during IDLE STATE 201 in the transmitter allows a receiver coupled to the transmitter to maintain synchronization with the transmitter. The use of a pattern comprised of alternating between the two inner points of the CAP 36 constellation during IDLE STATE 201 reduces cross talk (i.e., electromagnetic emissions) since the amplitude is as low as allowed within the confines of the CAP 36 encoding scheme, and the frequency is reduced by alternating between two points in opposing quadrants of the CAP 36 constellation. In addition, use of a TEST pattern which can be requested of a transmitter by a receiver when the transmitter is in IDLE STATE 201 allows filters in the receiver to be trained prior to receipt of data.

Since the present invention operates at relatively low frequency while transmitting at relatively high data rates, the present invention is able to transmit very large amounts of data over twisted pair conductors while operating within the limits for electromagnetic emissions set by Federal Communications Commission (FCC) as defined in FCC part 15 class B.

Also, in accordance with the present invention, the use of an error value associated with each component of each symbol received to generate a phase error signal PHERR to correct for phase errors between the TCLK in a first station and an independent RCLK in a second station by controlling the phase of the RCLK. Furthermore, the present invention is capable of phase locking the RCLK to a reference frequency in order to start (or restart) the RCLK at a known frequency near the frequency of the TCLK.

Still further, the AGC controller circuit of the present invention allows the received signal to be amplified in proportion with the strength of the received signal without disproportionately increasing the gain of the signal when the receiver is receiving an idle pattern in IDLE STATE 501. Also, since the present invention defines an idle pattern and TEST pattern, the near end cross talk canceler circuit 147 can be made relatively simply to cancel those particular tones when present. In addition, the present invention defines a jam pattern which allows the transmitter to indicate that a preamble has been received by the local receiver when the transmitter is in either PREAMBLE STATE 205 or DATA STATE 207. Defining a jam pattern allows the transmitter to cease transmitting and indicate to the receiver to which the transmitter is transmitting that the jam has occurred. This is particularly useful when the transmission is occurring from a repeater device.

Furthermore, an out of band control channel can be provided on one twisted pair of conductors, concurrent with transmission of data over a data channel provided on a second twisted pair of conductors. By providing an out of band control channel, the CAP symbol rate between a first and a second station can be increased. That is, if control signals are provided over an out of band control channel, the data channel can transmit more symbols per second.

A number of embodiments of the present invention have been described. Nevertheless, it will be understood that various modifications may be made without departing from the spirit and scope of the invention. For example, it should be understood that the particular pattern used to signal IDLE, JAM, DATA, and TEST conditions over an out of band control channel in accordance with one embodiment of the present invention is not critical to the present invention. As such any appropriate pattern may be used to signal IDLE, JAM, DATA, and TEST conditions over an out of band control channel. Furthermore, by increasing the number of twisted pairs available, the amount of data that can be transmitted between stations can be increased. Accordingly, it is to be understood that the invention is not to be limited by the specific illustrated embodiment, but only by the scope of the appended claims.

I claim:

1. A transceiver for receiving out-of-band control signals on a receive control channel over a first twisted pair of conductors, and for receiving in-band data on a data channel over a second twisted pair of conductors, including:

a. a first receiver, adapted to be coupled to the first twisted pair of conductors, for receiving said out-of-band control signals on a receive control channel, each out-of-band control signal being indicative of the state of the data channel;

b. a second receiver, adapted to be coupled to the second twisted pair of conductors, for receiving an in-band data signal on the data channel, the second receiver having a detector for canceling control signals transmitted from the transceiver over the second twisted pair of conductors and detecting data signals during transmission of such canceled control signals from the transceiver;

c. a processor, coupled to the first receiver and to the second receiver for determining the status of the data channel based upon the control signal received over the receive control channel.

2. The transceiver of claim 1, wherein the data received on the data channel is encoded in carrierless amplitude/phase encoding.

3. The transceiver of claim 1, wherein the first receiver further includes a detector having a plurality of slicer modes, each slicer mode defining a unique set of symbols such that the detector is limited to detecting only those symbols that are included within the unique set associated with the slicer mode in which the detector is operating.

4. The transceiver of claim 3, wherein the slicer modes include:

a. an idle slicer mode during which the detector is capable of detecting only idle symbols, preamble symbols, or test symbols;

b. preamble slicer mode during which the detector is capable of detecting only preamble symbols and start of frame symbols; and c. a data slicer mode during which the detector is capable of detecting all of the symbols which are defined for receipt by the receiver during a receiver data mode.

5. A transceiver for transmitting out-of-band control signals on a transmit control channel over a first twisted pair of conductors, and for transmitting in-band data on a data channel over a second twisted pair of conductors, including:

a. a first transmitter, adapted to be coupled to the first twisted pair of conductors, for transmitting said out-of-band control signals on a transmit control channel over the first twisted pair of conductors;

b. a second transmitter, adapted to be coupled to the second twisted pair of conductors, for transmitting said in-band data on a data channel over the second twisted pair of conductors;

c. a processor, coupled to the first and second transmitter, for determining the status of the data channel based upon the transmission activity on the data channel, and causing the first transmitter to transmit control signals associated with the data channel status.

6. The transceiver of claim 5, wherein the data transmitted on the data channel is encoded in carrierless amplitude/ phase encoding.

7. The transceiver of claim 5, further for receiving out-of-band signaling on a receive control channel over the second twisted pair of conductors, and for receiving in-band data on a receive data channel over the first twisted pair of conductors, further including:

(a) a first receiver, adapted to be coupled to the second twisted pair of conductors, for receiving an out-of-band control signal on a receive control channel;

(b) a second receiver, adapted to be coupled to the first twisted pair of conductors, for receiving an in-band data signal on a data channel over the first twisted pair of conductors at a rate of greater than approximately 60 million digital bits per second and a bit error rate of approximately less than $10^{-8}$ errors per second;

(c) a processor for determining the status of the receive data channel based upon each control signal received over the receive control channel.

8. A transceiver for receiving out-of-band signaling on a receive control channel over a first twisted pair of conductors, and for receiving in-band data on a data channel over a second twisted pair of conductors, including:

a. a first receiver, adapted to be coupled to the first twisted pair of conductors, for receiving an out-of-band control signal on said receive control channel, the out-of-band control signal including a clock pattern which indicates that data is presently being transmitted on the second twisted pair of conductors and a test pattern;

b. a second receiver, adapted to be coupled to the second twisted pair of conductors, for receiving said in-band data signal on said data channel, the second receiver being synchronized to the clock pattern received over the first twisted pair of conductors;

c. a processor for determining the status of the data channel based upon the control signal received over the receive control channel.

9. The transceiver of claim 8, wherein the out-of-band control signals further include an idle signal which indicates that no data is presently being transmitted on the second twisted pair of conductors.

10. The transceiver of claim 8, further including at least one receive filter, wherein the test pattern is used to train at least one of the receive filters.

11. The transceiver of claim 8, wherein the test pattern is a pseudo random sequence of inner constellation points of a CAP constellation.

12. The transceiver of claim 8, wherein the clock pattern is a periodic sequence of symbols represented by CAP constellation points.

13. The transceiver of claim 10, wherein the clock pattern alternates between a first and a second CAP constellation point.

14. The transceiver of claim 8, wherein the test pattern includes first and second CAP constellation points from opposite quadrants of the CAP constellation.

15. A transceiver for transmitting out-of-band signals on a transmit control channel over a first twisted pair of conductors, and for transmitting in-band data on a data channel over a second twisted pair of conductors, including:

a. a first transmitter, adapted to be coupled to the first twisted pair of conductors, for transmitting the out-of-band control signals on a transmit control channel, the out-of-band control signals including a clock pattern which indicates that data is presently being transmitted on the second twisted pair of conductors, an idle pattern which indicates that no data is presently being transmitted on the second twisted pair of conductors, and a test pattern;

b. a second transmitter, adapted to be coupled to the second twisted pair of conductors, for transmitting the in-band data on a data channel over the second twisted pair of conductors;

c. a near-end cross-talk canceler coupled to the first and the second transmitter for receiving the in-band data transmitted by the second transmitter, and canceling the in-band data from the out-of-band control signals transmitted from the first transmitter;

d. a processor, coupled to the first and second transmitters, for causing the status of the data channel to be indicated over the transmit control channel.

16. A method for communicating, including the steps of:

a. transmitting an out-of-band control signal on a first channel;

b. canceling the transmitted out-of-band control signals from the first channel in order to detect data symbols on the first channel;

c. transitioning from a first receiver state to a second receiver state upon detection of data symbols on the first channel;

d. transmitting data on a second channel;

e. receiving an out-of-band control signal on the second channel.

17. A method for communicating, including the steps of:

a. transmitting an out-of-band control signal on a first channel;

b. transmitting an in-band data signal on a second channel;

c. receiving an in-band data signal on the first channel; and d. receiving an out-of-band control signal on the second channel.

18. The method of claim 17, further including the steps of transmitting a test pattern on the second, channel if no data signals are transmitted within a predetermined amount of time.

19. The method of claim 18, wherein the test pattern is a pattern of CAP 32 symbols.

20. The method of claim 19, wherein the pattern of CAP 32 symbols include a pseudo random sequence of inner constellation points from among the constellation of CAP 32 points.

21. The method of claim 17, further including the step of generating a periodic clock signal on first channel by alternating between a first and second point in the CAP 32 constellation of points.

22. The method of claim 21, wherein the first and second points on the CAP 32 constellation are two inner constellation points within opposite quadrants of the CAP 32 constellation.

* * * * *